US011307042B2

(12) United States Patent
Slusar

(10) Patent No.: US 11,307,042 B2
(45) Date of Patent: Apr. 19, 2022

(54) THREE-DIMENSIONAL RISK MAPS

(71) Applicant: Allstate Insurance Company, Northbrook, IL (US)

(72) Inventor: Mark Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 299 days.

(21) Appl. No.: 14/863,476

(22) Filed: Sep. 24, 2015

(65) Prior Publication Data
US 2017/0089710 A1    Mar. 30, 2017

(51) Int. Cl.
*G01C 21/34* (2006.01)
*B60R 1/00* (2022.01)
(Continued)

(52) U.S. Cl.
CPC ........... *G01C 21/3461* (2013.01); *B60R 1/00* (2013.01); *G01C 21/3492* (2013.01); *G01C 21/3602* (2013.01); *G06K 9/00798* (2013.01); *G06K 9/00805* (2013.01); *G06Q 40/08* (2013.01); *G06T 15/205* (2013.01); *G06T 19/20* (2013.01); *B60R 2300/108* (2013.01); *B60R 2300/207* (2013.01); *B60R 2300/308* (2013.01); *B60R 2300/8093* (2013.01); *G06T 2210/61* (2013.01); *G06T 2219/2012* (2013.01)

(58) Field of Classification Search
CPC ......................................................... B60R 1/00
USPC ......................................................... 701/400
See application file for complete search history.

(56) References Cited

U.S. PATENT DOCUMENTS 5,467,388 A   11/1995  Redd, Jr. et al.
5,499,182 A    3/1996  Ousborne
(Continued)

FOREIGN PATENT DOCUMENTS

EP    0700009 A2    3/1996
JP    2015169472 A  9/2015
WO    2011004372 A1 1/2011

OTHER PUBLICATIONS

"Continental Head-up Display Augmented Reality HUD," http://continental-head-up-display.com/, website last visited on Apr. 30, 2015.
(Continued)

Primary Examiner — Charles A Fox
Assistant Examiner — Michael E Butler
(74) Attorney, Agent, or Firm — Dinsmore & Shohl, LLP

(57) ABSTRACT

Systems including one or more sensors, coupled to a vehicle, may detect sensor information and provide the sensor information to another computing device for processing. The processing may include analyzing the sensor information to identify one or more risk objects, such as animals, pedestrians, potholes, etc. The processing may further include generating a three-dimensional (3D) risk map, which may be displayed to a passenger in the vehicle. The 3D risk map may illustrate the one or more risk objects as one or more point clouds, respectively, within a virtual world representation of the vehicle's surroundings. Such a display may be used to alert drivers to possible risks while driving. In case of an accident, the 3D risk map may also be leveraged by insurance providers to process insurance claims and to notify customers that an insurance claim has been established.

20 Claims, 10 Drawing Sheets

(51) Int. Cl.
  *G01C 21/36* (2006.01)
  *G06K 9/00* (2022.01)
  *G06Q 40/08* (2012.01)
  *G06T 15/20* (2011.01)
  *G06T 19/20* (2011.01)

(56) References Cited

U.S. PATENT DOCUMENTS

| | | | |
|---|---|---|---|
| 5,619,568 A | 4/1997 | Miller | |
| 6,175,803 B1 | 1/2001 | Chowanic et al. | |
| 6,233,445 B1 | 5/2001 | Boltz et al. | |
| 6,351,698 B1 | 2/2002 | Kubota et al. | |
| 6,629,029 B1 | 9/2003 | Giles | |
| 6,868,386 B1 | 3/2005 | Henderson et al. | |
| 7,167,787 B2 | 1/2007 | Bastian et al. | |
| 7,292,152 B2 | 11/2007 | Torkkola et al. | |
| 7,356,516 B2 | 4/2008 | Richey et al. | |
| 7,535,344 B2 | 5/2009 | Obradovich | |
| 7,565,230 B2 | 7/2009 | Gardner et al. | |
| 7,657,441 B2 | 2/2010 | Richey et al. | |
| 7,659,827 B2 | 2/2010 | Gunderson et al. | |
| 7,742,792 B2 | 6/2010 | Matsui | |
| 8,090,598 B2 | 1/2012 | Bauer et al. | |
| 8,270,933 B2 | 9/2012 | Riemer et al. | |
| 8,275,348 B2 | 9/2012 | Yen et al. | |
| 8,311,858 B2 | 11/2012 | Everett et al. | |
| 8,314,708 B2 | 11/2012 | Gunderson et al. | |
| 8,332,242 B1 | 12/2012 | Medina, III | |
| 8,355,818 B2 | 1/2013 | Nielsen et al. | |
| 8,489,433 B2 | 7/2013 | Altieri et al. | |
| 8,506,512 B2 | 8/2013 | Aklog et al. | |
| 8,508,353 B2 | 8/2013 | Cook et al. | |
| 8,538,687 B2 | 9/2013 | Plocher et al. | |
| 8,606,512 B1 | 12/2013 | Bogovich et al. | |
| 8,612,139 B2 | 12/2013 | Wang et al. | |
| 8,620,575 B2 | 12/2013 | Vogt et al. | |
| 8,626,444 B2 | 1/2014 | Li et al. | |
| 8,655,965 B2 | 2/2014 | McWithey et al. | |
| 8,682,699 B2 * | 3/2014 | Collins | G06Q 40/08 705/4 |
| 8,686,872 B2 | 4/2014 | Szczerba et al. | |
| 8,712,429 B2 | 4/2014 | Nagorniak | |
| 8,731,768 B2 | 5/2014 | Fernandes et al. | |
| 8,744,492 B2 | 6/2014 | Kuo | |
| 8,805,707 B2 * | 8/2014 | Schumann, Jr. | G08G 1/096775 705/35 |
| 8,810,425 B2 | 8/2014 | Hyde et al. | |
| 8,824,997 B2 | 9/2014 | Gehlen et al. | |
| 8,860,564 B2 | 10/2014 | Rubin et al. | |
| 8,930,229 B2 | 1/2015 | Bowne et al. | |
| 8,971,927 B2 | 3/2015 | Zhou et al. | |
| 9,020,749 B2 | 4/2015 | Aso et al. | |
| 9,020,751 B1 | 4/2015 | Bogovich et al. | |
| 9,066,210 B2 | 6/2015 | Kalita et al. | |
| 9,082,072 B1 | 7/2015 | Wedding, Jr. et al. | |
| 9,142,142 B2 | 9/2015 | Nath et al. | |
| 9,150,154 B2 | 10/2015 | Miller et al. | |
| 9,207,675 B1 | 12/2015 | Walser et al. | |
| 9,519,670 B2 * | 12/2016 | Stanek | G06F 17/30336 |
| 9,574,888 B1 * | 2/2017 | Hu | G01C 21/3461 |
| 9,851,214 B1 | 12/2017 | Chintakindi | |
| 10,019,904 B1 | 7/2018 | Chan | |
| 2002/0046064 A1 | 4/2002 | Maury et al. | |
| 2002/0059084 A1 | 5/2002 | Wahlbin et al. | |
| 2004/0210353 A1 | 10/2004 | Rice | |
| 2004/0214615 A1 | 10/2004 | Entenmann et al. | |
| 2005/0060069 A1 * | 3/2005 | Breed | G01S 19/50 701/408 |
| 2005/0086227 A1 * | 4/2005 | Sullivan | G06T 17/05 |
| 2006/0053038 A1 | 3/2006 | Warren et al. | |
| 2006/0200008 A1 | 9/2006 | Moore-Ede | |
| 2006/0247852 A1 | 11/2006 | Kortge et al. | |
| 2007/0027726 A1 | 2/2007 | Warren et al. | |
| 2007/0136107 A1 | 6/2007 | Maguire et al. | |
| 2007/0226014 A1 | 9/2007 | Alemayehu et al. | |
| 2007/0268158 A1 | 11/2007 | Gunderson et al. | |
| 2008/0016145 A1 * | 1/2008 | Takase | G06T 17/05 709/203 |
| 2008/0059351 A1 | 3/2008 | Richey et al. | |
| 2008/0065427 A1 | 3/2008 | Helitzer et al. | |
| 2008/0120175 A1 | 5/2008 | Doering | |
| 2008/0243321 A1 | 10/2008 | Walser et al. | |
| 2008/0243558 A1 | 10/2008 | Gupte | |
| 2008/0255722 A1 | 10/2008 | McClellan et al. | |
| 2008/0255888 A1 | 10/2008 | Berkobin et al. | |
| 2008/0262670 A1 | 10/2008 | McClellan et al. | |
| 2008/0270519 A1 | 10/2008 | Ekdahl et al. | |
| 2008/0319602 A1 | 12/2008 | McClellan et al. | |
| 2009/0024273 A1 | 1/2009 | Follmer et al. | |
| 2009/0024419 A1 | 1/2009 | McClellan et al. | |
| 2009/0079555 A1 | 3/2009 | Aguirre De Carcer et al. | |
| 2009/0132294 A1 | 5/2009 | Haines | |
| 2010/0030582 A1 | 2/2010 | Rippel et al. | |
| 2010/0030592 A1 | 2/2010 | Evans et al. | |
| 2010/0042314 A1 | 2/2010 | Vogt et al. | |
| 2010/0057358 A1 | 3/2010 | Winer et al. | |
| 2010/0063850 A1 | 3/2010 | Daniel | |
| 2010/0131303 A1 | 5/2010 | Collopy et al. | |
| 2010/0131304 A1 | 5/2010 | Collopy et al. | |
| 2010/0157061 A1 | 6/2010 | Katsman et al. | |
| 2010/0174566 A1 | 7/2010 | Helitzer et al. | |
| 2010/0205012 A1 | 8/2010 | McClellan | |
| 2010/0211259 A1 | 8/2010 | McClellan | |
| 2010/0238009 A1 | 9/2010 | Cook et al. | |
| 2010/0250021 A1 | 9/2010 | Cook et al. | |
| 2010/0292886 A1 * | 11/2010 | Szczerba | G01C 21/365 701/31.4 |
| 2010/0323673 A1 | 12/2010 | Etram et al. | |
| 2011/0009107 A1 | 1/2011 | Guba et al. | |
| 2011/0039581 A1 | 2/2011 | Cai et al. | |
| 2011/0054716 A1 * | 3/2011 | Stahlin | G01C 21/28 701/1 |
| 2011/0090221 A1 | 4/2011 | Ren | |
| 2011/0092159 A1 | 4/2011 | Park et al. | |
| 2011/0106370 A1 | 5/2011 | Duddle et al. | |
| 2011/0144909 A1 | 6/2011 | Ren et al. | |
| 2011/0161116 A1 | 6/2011 | Peak et al. | |
| 2011/0196571 A1 | 8/2011 | Foladare et al. | |
| 2011/0205043 A1 | 8/2011 | Fujiki et al. | |
| 2011/0213628 A1 | 9/2011 | Peak et al. | |
| 2011/0219080 A1 | 9/2011 | McWithey et al. | |
| 2011/0269441 A1 | 11/2011 | Silver | |
| 2011/0320492 A1 | 12/2011 | Inghelbrecht | |
| 2012/0004933 A1 | 1/2012 | Foladare et al. | |
| 2012/0010906 A1 | 1/2012 | Foladare et al. | |
| 2012/0021386 A1 | 1/2012 | Anderson et al. | |
| 2012/0072243 A1 | 3/2012 | Collins et al. | |
| 2012/0072244 A1 | 3/2012 | Collins et al. | |
| 2012/0083287 A1 | 4/2012 | Casto et al. | |
| 2012/0101855 A1 | 4/2012 | Collins et al. | |
| 2012/0109692 A1 | 5/2012 | Collins et al. | |
| 2012/0123806 A1 | 5/2012 | Schumann, Jr. et al. | |
| 2012/0166229 A1 | 6/2012 | Collins et al. | |
| 2012/0197669 A1 | 8/2012 | Kote et al. | |
| 2012/0209632 A1 | 8/2012 | Kaminski et al. | |
| 2012/0226421 A1 | 9/2012 | Kote et al. | |
| 2012/0246192 A1 | 9/2012 | Kenyon | |
| 2012/0253586 A1 | 10/2012 | Sakakibara | |
| 2012/0289214 A1 | 11/2012 | Hynes et al. | |
| 2012/0311416 A1 | 12/2012 | Richter et al. | |
| 2012/0316933 A1 | 12/2012 | Pentland et al. | |
| 2013/0006674 A1 | 1/2013 | Bowne et al. | |
| 2013/0006675 A1 | 1/2013 | Bowne et al. | |
| 2013/0006715 A1 | 1/2013 | Warkentin et al. | |
| 2013/0024060 A1 | 1/2013 | Sukkarie et al. | |
| 2013/0046559 A1 | 2/2013 | Coleman et al. | |
| 2013/0073321 A1 | 3/2013 | Hofmann et al. | |
| 2013/0078963 A1 | 3/2013 | Prasad et al. | |
| 2013/0090803 A1 * | 4/2013 | Stahlin | G06K 9/6289 701/30.3 |
| 2013/0110310 A1 | 5/2013 | Young | |
| 2013/0124082 A1 | 5/2013 | Cho | |
| 2013/0137404 A1 | 5/2013 | Kuo | |

(56) References Cited

U.S. PATENT DOCUMENTS

| | | | |
|---|---|---|---|
| 2013/0151288 | A1 | 6/2013 | Bowne et al. |
| 2013/0157640 | A1 | 6/2013 | Aycock |
| 2013/0166325 | A1 | 6/2013 | Ganapathy et al. |
| 2013/0238233 | A1 | 9/2013 | Kim et al. |
| 2013/0304514 | A1 | 11/2013 | Hyde et al. |
| 2013/0317736 | A1 | 11/2013 | Fernandes et al. |
| 2014/0019170 | A1 | 1/2014 | Coleman et al. |
| 2014/0067434 | A1 | 3/2014 | Bourne et al. |
| 2014/0074402 | A1 | 3/2014 | Hassib et al. |
| 2014/0080100 | A1 | 3/2014 | Phelan et al. |
| 2014/0180723 | A1 | 6/2014 | Cote et al. |
| 2014/0207497 | A1 | 7/2014 | Collins et al. |
| 2014/0222280 | A1* | 8/2014 | Salomonsson ......... G08G 1/167 701/28 |
| 2014/0257869 | A1 | 9/2014 | Binion et al. |
| 2014/0257871 | A1 | 9/2014 | Christensen et al. |
| 2014/0267263 | A1 | 9/2014 | Beckwith et al. |
| 2014/0267627 | A1 | 9/2014 | Freeman et al. |
| 2014/0268353 | A1 | 9/2014 | Fujimura et al. |
| 2014/0277939 | A1 | 9/2014 | Ren et al. |
| 2014/0336866 | A1* | 11/2014 | Kloeden ............... G08C 25/00 701/30.3 |
| 2014/0350970 | A1 | 11/2014 | Schumann, Jr. et al. |
| 2014/0358840 | A1 | 12/2014 | Tadic et al. |
| 2015/0006207 | A1 | 1/2015 | Jarvis et al. |
| 2015/0056973 | A1 | 2/2015 | Efrati |
| 2015/0066360 | A1* | 3/2015 | Kirsch ............... G01C 21/3688 701/438 |
| 2015/0112545 | A1 | 4/2015 | Binion et al. |
| 2015/0112730 | A1 | 4/2015 | Binion et al. |
| 2015/0112800 | A1 | 4/2015 | Binion et al. |
| 2015/0172450 | A1 | 6/2015 | Singhal |
| 2015/0187016 | A1 | 7/2015 | Adams et al. |
| 2015/0187019 | A1 | 7/2015 | Fernandes et al. |
| 2015/0241226 | A1 | 8/2015 | Engelman et al. |
| 2016/0047666 | A1 | 2/2016 | Fuchs |
| 2016/0050315 | A1 | 2/2016 | Malhotra et al. |
| 2016/0073240 | A1 | 3/2016 | Helm |
| 2016/0134744 | A1 | 5/2016 | de la Fuente Sanchez |
| 2016/0231278 | A1* | 8/2016 | Goroshevskiy ......... G01N 27/82 |
| 2017/0122989 | A1* | 5/2017 | Ho ..................... G01R 21/1333 |
| 2018/0158334 | A1* | 6/2018 | Perez Barrera ........ B60Q 9/008 |
| 2018/0162410 | A1* | 6/2018 | Skillsater .............. B60W 30/04 |
| 2018/0362026 | A1* | 12/2018 | Heimberger ...... B60W 30/0953 |

OTHER PUBLICATIONS

"In the Future, Your Car's Windscreen Will Be an Augmented Reality Display," https://transportevolved.com/2014/09/29/future-cars-windscreen-will-augmented-reality-display/, website last visited on Apr. 30, 2015.

"Autonomous Cars from Berlin," website: http://autonomos-labs.com/research/, website last visited on Apr. 30, 2015.

Dec. 5, 2016—International Search Report and Written Opinion of PCT/US2016/052877.

"Telematics: Reinventing Auto Insurance," retrieved Sep. 6, 2011 from http://www.insurancetech.com/blog/archives/2010/03/telematics_the.html, 10 pages.

"Axeda and Walsh Vision Announce Alliance for Cloud Telematics Solutions" retrieved Sep. 6, 2011 from http://www.cbs19.tv/story/15234817/axeda-and-walsh-vision-announce-alliance-for-cloud-telematics-solutions pp. 1-4.

Martin Demers, "Waste Fleet Safety: Influencing Driver Behavior" 2010 Waste Management Magazine, pp. 1-3.

"Insurance Companies Utilizing Technology" Fairbault Daily News, May 10, 2011, http://www.fairbault.com/print/11435 pp. 1-3.

Jul. 13, 2015 U.S. Non-Final Office Action—U.S. Appl. No. 14/066,988.

Sep. 30, 2015 U.S. Non-Final Office Action—U.S. Appl. No. 14/227,740.

Jul. 20, 2015—U.S. Non-Final Office Action—U.S. Appl. No. 13/564,524.

Sep. 1, 2016—U.S. Final Office Action—U.S. Appl No. 13/564,524.

Jun. 10, 2016 U.S. Non-Final Office Action—U.S. Appl. No. 14/066,988.

Nov. 22, 2016—U.S. Final Office Action—U.S. Appl. No. 14/066,988.

Mar. 28, 2016—U.S. Non-Final Office Action—U.S. Appl. No. 13/564,524.

Nov. 23, 2015—U.S. Final Office Action—U.S. Appl. No. 13/564,524.

Feb. 4, 2014—U.S. Final Office Action—U.S. Appl. No. 13/564,524.

Oct. 8, 2013—U.S. Non-Final Office Action—U.S. Appl. No. 13/564,524.

Mar. 23, 2016—U.S. Final Office Action—U.S. Appl. No. 14/227,740.

Jan. 31, 2017—U.S. Non-Final Office Action—U.S. Appl. No. 14/227,740.

Nov. 23, 2015—U.S. Final Office Action—U.S. Appl. No. 14/066,988.

Shabeer, et. al, "Mobile Communication Safety on Road Transport," WSEAS Transactions on Communications, E-ISSN: 2224-2864, Issue 3, vol. 12, Mar. 2013, 12 pages.

"Drive Control—For When you Need a Little More Self Control," retrieved Apr. 8, 2016 from https://drivecontrolapp.com, 2 pages.

Mar. 3, 2017—U.S. Non-Final Office Action—U.S. Appl. No. 15/284,801.

May 19, 2017 (WO) International Search Report and Written Opinion—PCT/IN2016/50370.

Jun. 6, 2017—U.S. Non-Final Office Action—U.S. Appl. No. 13/564,524.

Jun. 7, 2017—U.S. Final Office Action—U.S. Appl. No. 14/227,740.

May 24, 2017—(WO) International Search Report and Written Opinion—PCT/IN16/50369.

Jun. 23, 2017—U.S. Non-Final Office Action—U.S. Appl. No. 15/284,728.

Feb. 2, 2017—(WO) International Search Report and Written Opinion—App PCT/US2016/063527.

Williams, Geoff—Should You Try Pay-As-You-Drive Insurance?, Jan. 13, 2014, http://money.usnews.com/money/personal-finance/articles/2014/01/13/should-you-try-pay-as-you-drive-insurance, U.S. News & World Report.

Rafter, Michelle—Use-Based Insurance Shifts Into High Gear, http://www.edmunds.com/auto-insurance/pay-as-you-drive-insurance-goes-into-high-gear.html, Feb. 27, 2014, Edmunds.

Chalon Smith, Mark—Pay-As-You-Drive Discounts: A Guide, http://www.insurance.com/auto-insurance/saving-money/low-mileage-discounts-guide.html, Apr. 22, 2015, Insurance.com.

How's My Driving?—http://www.economist.com/news/finance-and-economics/21572237-gizmos-track-driving-habits-me-changing-face-car-insurance-hows-my—Feb. 23, 2013—Print Edition of the Economist.

Usage-Based Insurance and Telematics, http://www.naic.org/cipr_topics/topic_usage_based_insurance.htm, Last Updated Dec. 14, 2015—National Association of Insurance Commissioners & The Center for Insurance Policy and Research.

Dewri, Rinku et al—Inferring Trip Destinations From Driving Habits Data, http://www.cs.du.edu/~rdewri/data/MyPapers/Conferences/2013WPES-Extended.pdf, Last Visited Feb. 25, 2016.

Rosolino, V. et al: "Road Safety Performance Assessment: A New Road Network Risk Index for Info Mobility", ScienceDirect: Procedia—Social and Behavioral Sciences 111 (2014) pp. 624-633.

Li, Z et. al.: "Road Risk Modeling and Cloud-Aided Safety-Based Route Planning", Published in Cybernetics, IEEE Translations dated Oct. 2, 2015, pp. 1-2.

"Road Asset Management", https://www.arrb.com/au/Infrastructure/Road-asset-management.aspx, Last visited Oct. 8, 2015, pp. 1-5.

Mar. 20, 2018—U.S. Non-Final Office Action—U.S. Appl No. 15/052,291.

Feb. 26, 2018—U.S. Non-Final Office Action—U.S. Appl. No. 14/227,740.

Mar. 1, 2018—U.S. Non-Final Office Action—U.S. Appl. No. 15/284,728.

Nov. 28, 2018—U.S. Non-Final Office Action—U.S. Appl. No. 15/268,750.

Nov. 29, 2018—U.S. Notice of Allowance—U.S. Appl. No. 15/959,527.

"Junior: The Stanford Entry in the Urban Challenge", Michael Montemerlo et al., Journal of Field Robotics, vol. 25, No. 9, Sep. 1, 2008, pp. 569-597, XP055169616.

(56) References Cited

OTHER PUBLICATIONS

"Moving Object Detection with Laser Scanners", Christoph Mertz et al., Journal of Field Robotics, vol. 30, No. 1, Jul. 3, 2012, pp. 17-43, XP055460334.
Apr. 12, 2019—U.S. Final Office Action—U.S. Appl. No. 15/268,750.
Apr. 2, 2019—U.S. Non-Final Office Action—U.S. Appl. No. 15/052,291.
May 24, 2019—(EP) Extended Supplemental Search Report—EP Application No. 16849502.6.
Jun. 13, 2019—(CA) Office Action—Application No. 3,015,235.
Sep. 6, 2019—(EP) Extended Search Report—Application No. 16891883.7 (006591.01864).
Oct. 2, 2019—U.S. Non-Final Office Action—U.S. Appl. No. 15/268,750.
Nov. 13, 2019—U.S. Final Office Action—U.S. Appl. No. 15/052,291.
Jun. 29, 2018—U.S. Non-Final Office Action—U.S. Appl. No. 15/959,527.
Sep. 4, 2018—U.S. Notice of Allowance—U.S. Appl. No. 15/284,728.
Oct. 17, 2018 U.S. Final Office Action—U.S. Appl. No. 15/052,291.
Nov. 2, 2018—U.S. Non-Final Office Action—U.S. Appl. No. 15/160,208.
Aug. 9, 2017—U.S. Final Office Action—U.S. Appl. No. 15/284,801.
Sep. 12, 2017—U.S. Final Office Action—U.S. Appl. No. 13/564,524.
Sep. 13, 2017—U.S. Non-Final Office Action—U.S. Appl. No. 14/066,988.
Nov. 22, 2017—U.S. Notice of Allowance—U.S. Appl. No. 15/284,728.
Jan. 24, 2018—U.S. Notice of Allowance—U.S. Appl. No. 15/284,801.
Jul. 22, 2020—(CA) Office Action—App. No. 3015235.
Aug. 24, 2020—(EP) Examination Report—App. No. 16849502.6.
Aug. 18, 2020—(IN) Examination Report—App. No. 201817034104.
Sep. 23, 2020—U.S. Final Office Action—U.S. Appl. No. 15/052,291.
Oct. 15, 2020—U.S. Non-Final Office Action—U.S. Appl. No. 16/905,215.
Nov. 26, 2018—(CA) Office Action—App. No. 2999498.

\* cited by examiner

THREE-DIMENSIONAL RISK MAPS

BACKGROUND

Recently, many vehicles come equipped with global positioning system (GPS) devices that help drivers to navigate roads to various locations. Moreover, many drivers use other mobile devices (e.g., smart phones) that have GPS devices therein to help the drivers navigate roads. These GPS devices may provide location information and use maps for navigation purposes. As GPS devices have become more prevalent, the different uses for their location information have come to light. In some instances, the danger level of different routes is determined by combining location information and accident history information. Although some entities may find the danger level of certain routes useful and interesting, such information alone might not significantly reduce the likelihood of accidents occurring. Therefore, there remains a desire for methods and systems that may help drivers avoid accidents. Moreover, in the event of an accident, there is a desire for methods and systems that utilize information regarding the environment in which the accident occurred to help other drivers avoid a similar accident.

Additionally, it is difficult to use the location information to determine the cause of the accident when the location information merely includes GPS coordinates. Insurance providers may find determining the cause of an accident particularly important. When an accident occurs, a driver (or insurance policy holder of the damaged vehicle) may file an insurance claim with an insurance provider to cover the cost of repairing a vehicle. The insurance provider may wish to determine the cause of the accident in order to properly process the insurance claim and curtail insurance fraud. In some cases, employees of an insurance provider (e.g., insurance adjusters) may be dispatched to inspect a damaged vehicle or to inspect the site of the accident to determine the cause of the accident. Inspecting the site or vehicle may be important for record keeping or determining whether insurance coverage is applicable. As such, insurance customers may become frustrated and inconvenienced by the processing time of an insurance claim. Accordingly, there is a desire for methods and systems that facilitate the automatic processing of insurance claims.

SUMMARY

The following summary is for illustrative purposes only and is not intended to limit or constrain the detailed description. The following summary merely presents various described aspects in a simplified form as a prelude to a more detailed description provided below.

Various approaches to helping users identify and mitigate risk are presented. In accordance with aspects of the disclosure, a computing system may generate, based on a vehicle traveling on a segment of road, a three-dimensional (3D) map for identifying and alerting a user of a potential risk (e.g., a risk object). The system may receive various types of information, including but not limited to, accident information, geographic information, environmental information, risk information, and vehicle information from one or more sensors. The system may generate a 3D risk map using the received information. The system may calculate a risk value (e.g. risk score, route risk score, road risk score, road segment risk score, risk object risk score, etc.) and associate the risk score to a particular road segment. Further, the system may provide alerts to a user by indicating an identification of a risk object based on the calculated risk score of the risk object.

In other aspects of the present disclosure, a personal navigation device, mobile device, and/or personal computing device may communicate, directly or indirectly, with a server (or other device) to transmit and receive a risk score(s), a 3D risk map(s), and/or received information. The device may receive travel route information and query the memory for associated risk scores and 3D risk maps. The risk scores may be sent for display on the device (via the 3D risk map) or for recording in memory. The contents of memory may also be uploaded to a system data storage device for use by a network device (e.g., server) to perform various actions. For example, an insurance company may use the information stored in the system data storage device to take various actions (e.g., file a claim, adjust a user's insurance premium, etc.).

In other aspects of the disclosure, a personal navigation device, mobile device, and/or personal computing device may access a database of risk scores to assist in identifying and indicating alternate lower-risk travel routes. A driver may select among the various travel routes presented, taking into account one or more factors such as the driver's tolerance for risk or the driver's desire to lower the cost of their insurance. These factors may be saved in memory designating the driver's preferences. Depending on the driver's selection or preference, the cost or other aspects of the vehicle's insurance coverage may be adjusted accordingly for either the current insurance policy period or a future insurance policy period.

Certain other aspects of the disclosure include a system comprising one or more sensors coupled to a vehicle and configured to detect sensor information. The system may also include a first computing device configured to communicate with the one or more sensors to receive the sensor information; analyze the sensor information to identify one or more risk objects; generate a three-dimensional (3D) risk map illustrating the one or more risk objects as one or more point clouds, respectively, within a virtual world representation of the vehicle's surroundings; and display the 3D risk map to a passenger in the vehicle.

Certain other aspects of the disclosure may include a system comprising one or more sensors coupled to a vehicle and configured to detect sensor information. The system may also include a first computing device configured to communicate with the one or more sensors to receive the sensor information; analyze the sensor information to identify one or more risk objects; generate a three-dimensional (3D) risk map illustrating the one or more risk objects as one or more point clouds, respectively, within a virtual world representation of the vehicle's surroundings; store the 3D risk map; determine, based on the sensor information, that the vehicle was in an accident; analyze the 3D risk map to determine a cause of the accident; and construct, based on the cause of the accident, an insurance claim.

The details of these and other aspects of the disclosure are set forth in the accompanying drawings and descriptions below. Other features and advantages of aspects of the disclosure may be apparent from the descriptions and drawings.

BRIEF DESCRIPTION OF THE DRAWINGS

These and other features, aspects, and advantages of the present disclosure will become better understood with regard to the following description, claims, and drawings.

DETAILED DESCRIPTION

In accordance with various aspects of the disclosure, methods, non-transitory computer-readable media, and apparatuses are disclosed for generating a three-dimensional (3D) risk map and alerting a driver about a potential risk surrounding the vehicle.

Figure 1:
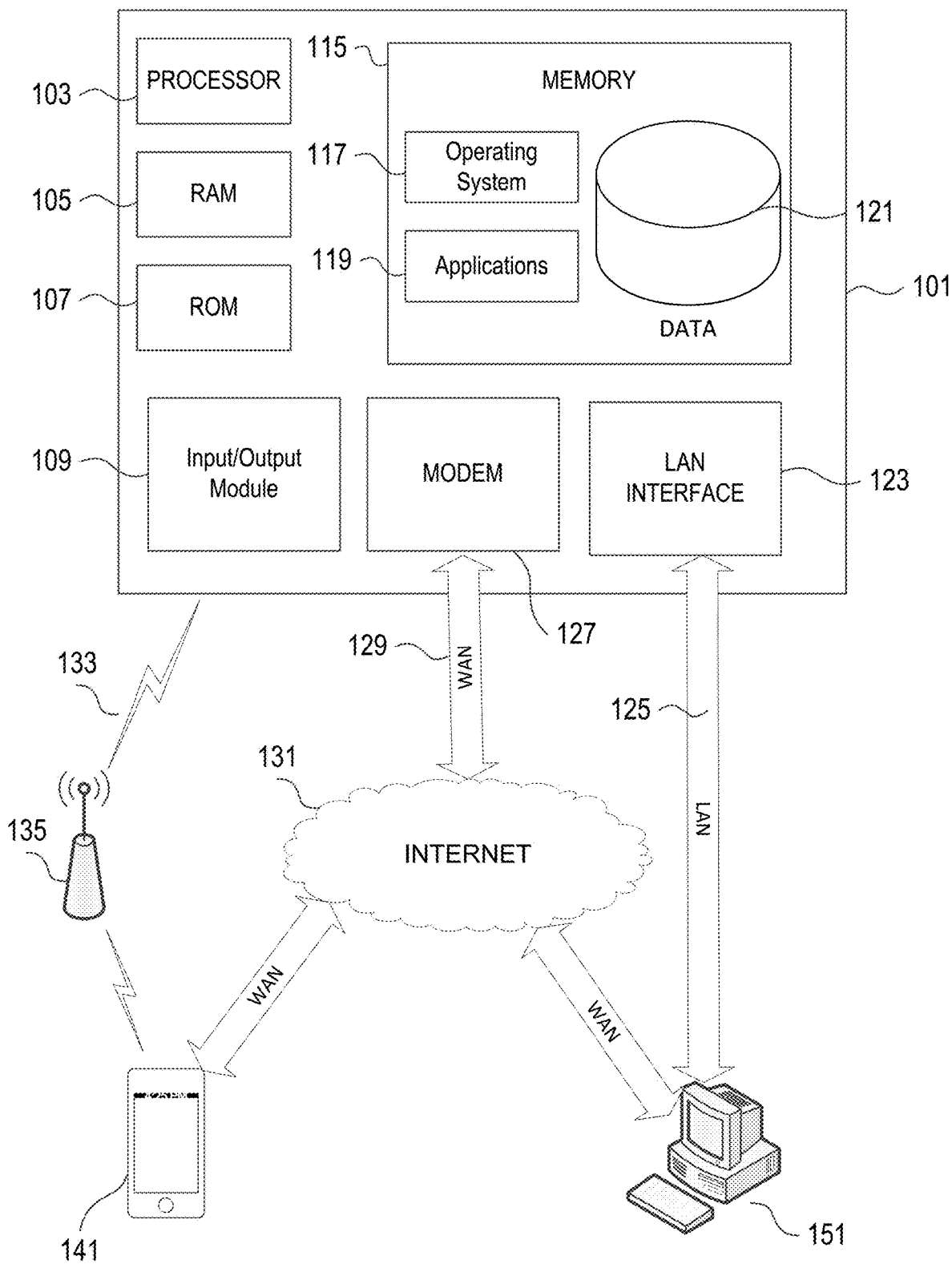
FIG. 1 illustrates an example operating environment in accordance with aspects of the present disclosure.

FIG. 1 illustrates an example of a suitable computing system 100 that may be used according to one or more illustrative embodiments. The computing system 100 is only one example of a suitable computing system and is not intended to suggest any limitation as to the scope of use or functionality contained in the present disclosure. The computing system 100 should not be interpreted as having any dependency or requirement relating to any one or combination of components shown in the illustrative computing system.

The present disclosure is operational with numerous other general purpose or special purpose computing systems or configurations. Examples of well-known computing systems, environments, and/or configurations that may be suitable for use with the disclosed embodiments include, but are not limited to, personal computers (PCs), server computers, hand-held or laptop devices, mobile devices, tablets, multi-processor systems, microprocessor-based systems, set-top boxes, programmable consumer electronics, network PCs, minicomputers, mainframe computers, distributed computing environments that include any of the above systems or devices, and the like.

With reference to FIG. 1, the computing system 100 may include a computing device 101 wherein the processes discussed herein may be implemented. The computing device 101 may have a processor 103 for controlling the overall operation of the random access memory (RAM) 105, read-only memory (ROM) 107, input/output module 109, memory 115, modem 127, and local area network (LAN) interface 123. Processor 103 and its associated components may allow the computing device 101 to run a series of computer readable instructions related to receiving, storing, generating, calculating, identifying, and analyzing data to generate a risk map. Computing system 100 may also include optical scanners (not shown). Exemplary usages include scanning and converting paper documents, such as correspondence, data, and the like to digital files.

Computing device 101 may include a variety of computer-readable media. Computer-readable media may be any available media that may be accessed by computing device 101 and include both volatile and non-volatile media as well as removable and non-removable media. Computer-readable media may be implemented in any method or technology for storage of information such as computer-readable instructions, data structures, program modules, or other data. Computer-readable media include, but are not limited to, random access memory (RAM), read only memory (ROM), electronically erasable programmable read only memory (EEPROM), flash memory or other memory technology, or any other medium that can be used to store desired information that can be accessed by computing device 101. For example, computer-readable media may comprise a combination of computer storage media (including non-transitory computer-readable media) and communication media.

RAM 105 may include one or more applications representing the application data stored in RAM 105 while the computing device 101 is on and corresponding software applications (e.g., software tasks) are running on the computing device 101.

Input/output module 109 may include a sensor(s), a keypad, a touch screen, a microphone, and/or a stylus through which a user of computing device 101 may provide input, and may also include a speaker(s) for providing audio output and a video display device for providing textual, audiovisual, and/or graphical output.

Software may be stored within memory 115 and/or storage to provide instructions to processor 103 for enabling computing device 101 to perform various functions. For example, memory 115 may store software used by the computing device 101, such as an operation system 117, application program(s) 119, and an associated database 121. Also, some or all of the computer-executable instructions for computing device 101 may be embodied in hardware or firmware.

Computing device 101 may operate in a networked environment supporting connections to one or more remote computing devices, such as computing devices 135, 141, and 151. The computing devices 141 and 151 may be personal computing devices, mobile computing devices, or servers that include many or all of the elements described above about the computing device 101. The computing device 135 may be a transceiver or sensor that includes many or all of the elements described above about computing device 101.

The network connections depicted in FIG. 1 include a local area network (LAN) 125 and a wide area network (WAN) 129, but may also include another type of network. When used in a LAN networking environment, computing device (e.g. in some instances a server) 101 may be connected to the LAN 125 through a network interface (e.g. LAN interface 123) or adapter in the communications module 109. When used in a WAN networking environment, the computing device 101 may include a modem 127 or other means for establishing communications over the WAN 129, such as the Internet 131 or another type of computer network. It will be appreciated that the network connections shown are illustrative, and other means of establishing a communications link between the computing devices may be used. Various well-known protocols such as TCP/IP, Ethernet, FTP, HTTP and the like may be used, and the system may be operated in a client-server configuration to permit a user to retrieve a web page from a web-based server. Further, various conventional web browsers may be used to display and manipulate web pages.

Various aspects described herein may be embodied as a method, a data processing system, or as a computer-readable medium storing computer-executable instructions. For example, a computer-readable medium may store instructions to cause a processor 103 to perform steps of methods described herein. Such a processor 103 may execute computer-executable instructions stored on a computer-readable medium.

Figure 2:
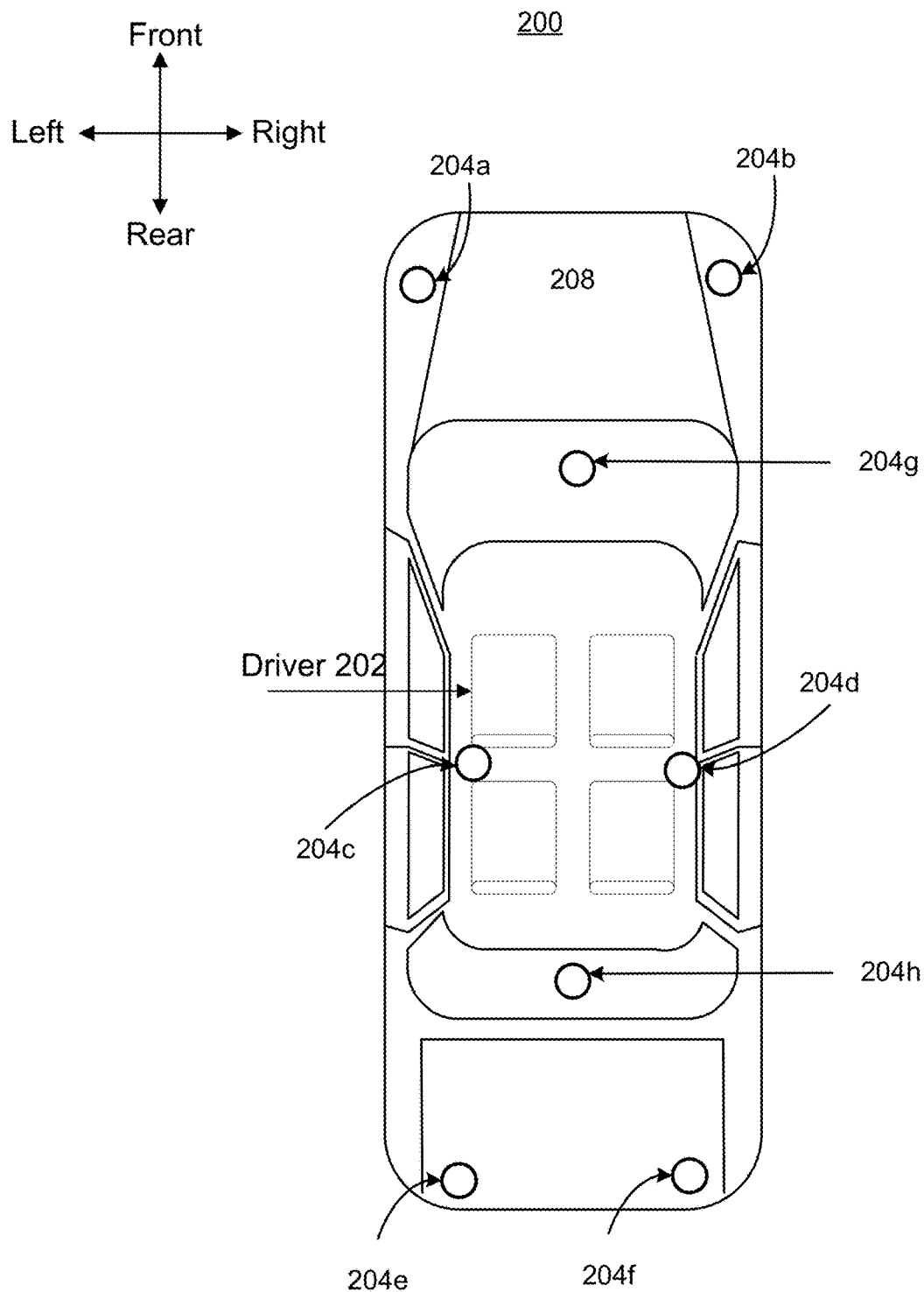
FIG. 2 depicts an example of sensors coupled to a vehicle in accordance with aspects of the present disclosure.

FIG. 2 illustrates an example system in which sensors 204 are coupled to a vehicle 208. In other examples, only a single sensor 204 may be used. The sensors 204 may be coupled to vehicle 208 in the arrangement shown in FIG. 2 or in other various arrangements (not shown). During operation of the vehicle 208, a user (e.g., driver, passenger, etc.) of the vehicle 208 may be located at the position depicted by identifier 202. Sensors 204 (e.g. 204a through 204h) may be located inside, outside, on the front, on the rear/back, on the top, on the bottom, and/or on each side of the vehicle 208. In some cases, the number of sensors 204 used and positioning of the sensors 204 may depend on the vehicle 208, so that sensor information for all areas surrounding the vehicle 208 may be collected.

The sensor(s) 204 may gather or detect sensor information. The sensor information may comprise data that represents the external surroundings of the vehicle 208. In some examples, the sensor information may include data that represents the vehicle 208 itself so that the vehicle's shape and size may be determined from such data. The sensor(s) 204 may comprise a light detection and ranging (LIDAR) sensor, a sound navigation and ranging (SONAR) sensor, a video/image recording sensor, a light sensor, a thermal sensor, an optical sensor, an acceleration sensor, a vibration sensor, a motion sensor, a position sensor, a point cloud sensor (e.g., for obtaining data to generate a point cloud figure/object/image/etc.), a technology (e.g., sensing device or scanner) used to sense and detect the characteristics of the sensing device's surroundings and/or environment, and the like. In some embodiments, each sensor 204a through 204h may be the same type of sensor. In other embodiments, sensors 204a through 204h may comprise a combination of different sensors. For example, sensor 204a may be a LIDAR sensor, and sensor 204b may be an optical sensor. In some embodiments, the sensors 204 may be specially designed to combine multiple technologies (e.g., a sensor 204 may include accelerometer and LIDAR components). In some aspects, the sensor information may be in the form of vectors. The vectors may be labeled or organized based on classification of each vector. The classification of each vector (and/or sets of vectors) may be generated using a formulaic or machine learning approach. The information the vector contains, or more generally, the sensor information, may be stored, quantized, or interpreted with other approaches, e.g., graph data for semantic inference queries at a later point in time.

The system may gather additional information, such as environmental information, road information, vehicle information, weather information, geographic location information, accident information, etc. Environmental information may comprise data about the surroundings of the vehicle 208. In some embodiments, the environmental information may comprise road, weather, and geographic information. For example, environmental information may comprise data about the type of route the vehicle 208 is traveling along (e.g., if the route is rural, city, residential, etc.). In another example, the environmental information may include data identifying the surroundings relative to the road being traveled by the vehicle 208 (e.g., animals, businesses, schools, houses, playgrounds, parks, etc.). As another example, the environmental information may include data detailing foot traffic and other types of traffic (e.g. pedestrians, cyclists, motorcyclists, and the like).

Road information may comprise data about the physical attributes of the road (e.g., slope, pitch, surface type, grade, and the like). In some aspects, the physical attributes of the road may comprise a pothole(s), a slit(s), an oil slick(s), a speed bump(s), an elevation(s) or unevenness (e.g., if one lane of road is higher than the other, which often occurs when road work is being done), etc. In some embodiments, road information may comprise the physical conditions of the road (e.g., flooded, wet, slick, icy, plowed, not plowed/snow covered, etc.). In some instances, road information may be data from a sensor that gathers and/or analyzes some, most, or all vertical changes in a road. In other examples, road information may include information about characteristics corresponding to the rules of the road or descriptions of the road: posted speed limit, construction area indicator (e.g., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of roads/lanes, population density, condition of road (e.g., new, worn, severely damaged with sink-holes, severely damaged by erosion, gravel, dirt, paved, etc.), wildlife area, state, county, and/or municipality. In some embodiments, road information may include data about infrastructure features of the road. For example, infrastructure features may include intersections, bridges, tunnels, railroad crossings, and other roadway features.

Weather information may comprise data about the weather conditions relative to a vehicle's 208 location (e.g., snowing, raining, windy, sunny, dusk, dark, etc.). In some aspects, weather information may include a forecast of potential weather conditions for a segment of a road being traveled by vehicle 208. For example, weather information may include a storm warning, a tornado warning, a flood warning, a hurricane warning, etc. In some aspects, weather information may provide data about road segments affected by weather conditions. For example, weather information may detail which roads are flooded, icy, slick, snow-covered, plowed, or closed. As another example, the weather information may include data about glare, fog, and the like.

Vehicle information may comprise data about how the vehicle 208 is operated (e.g., driving behavior). In some embodiments, a vehicle telematics device may be used to gather information about operation of a vehicle. For example, the vehicle telematics device may gather data about the breaking, accelerating, speeding, and turning of a vehicle 208. In some aspects, vehicle information may comprise accident information (which will be described later). For example, vehicle information may include data that describes incidents (e.g., vehicle accidents) and a particular location where the incident occurred (e.g., geographic coordinates associated with a road segment, intersection, etc.). In some aspects, vehicle information may include the vehicle make, vehicle model, vehicle year, and the like. In some instances, vehicle information may comprise data collected through one or more in-vehicle devices or systems such as an event data recorder (EDR), onboard diagnostic system, or global positioning satellite (GPS) device. Examples of information collected by such devices include speed at impact, brakes applied, throttle position, direction at impact, and the like. In some examples, vehicle information may also include information about the user (e.g., driver, passenger, and the like) associated with the vehicle 208.

In some aspects, user information may include data about a user's age, gender, marital status, occupation, blood alcohol level, credit score, eyesight (e.g., whether the user wears glasses and/or glasses prescription strength), height, and physical disability or impairment. In some instances, user information may include data about the user's distance from a destination, route of travel (e.g., start destination and end destination), and the like. In some embodiments, the user information may comprise data about the user's non-operation activities while operating a vehicle 208. For example, the data may comprise the user's mobile phone usage while operating the vehicle 208 (e.g., whether the user was talking on a mobile device, texting on a mobile device, searching on the internet on a mobile device, etc.), the number of occupants in the vehicle 208, the time of day the user was operating the vehicle 208, etc.

Geographic location information may comprise data about the physical location of a vehicle 208. For example, the geographic location information may comprise coordinates with the longitude and latitude of the vehicle, or a determination of the closest address to the actual location of the vehicle 208. In another example, the vehicle location data may comprise trip data indicating a route the vehicle 208 is traveling along. In some aspects, the geographic location information may also include information that describes the geographic boundaries, for example, of an intersection (e.g. where vehicle 208 is located) which includes all information that is associated within a circular area defined by the coordinates of the center of the intersection and points within a specified radius of the center. In some embodiments, geographic location information may consist of numerous alternative routes a vehicle 208 may travel to reach a selected destination.

Accident information may comprise information about whether a vehicle 208 was in an accident. In some aspects, accident information may identify damaged parts of the vehicle 208 resulting from the accident. For example, accident information may detail that the front bumper, right door, and right front headlight of the vehicle 208 were damaged in an accident. In some examples, accident information may detail the cost of replacement or repair of each part damaged in an accident. In some instances, accident information may include previously described vehicle information. In some embodiments, accident information may include data about the location of the accident with respect to a road segment where the accident occurred. For example, accident information may include where the accident occurred on the road segment (e.g., which lane), the type of road the accident occurred on (e.g., highway, dirt, one-way, etc.), time of day the accident occurred (e.g., daytime, night time, rush hour, etc.), and the like.

Some additional examples of accident information may include loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, side- swiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident.

Accident information associated with vehicle accidents may be stored in a database format and may be compiled per road segment and/or risk map. One skilled in the art will understand that the term road segment may be used to describe a stretch of road between two points as well as an intersection, roundabout, bridge, tunnel, ramp, parking lot, railroad crossing, or other feature that a vehicle 208 may encounter along a route.

Figure 3:
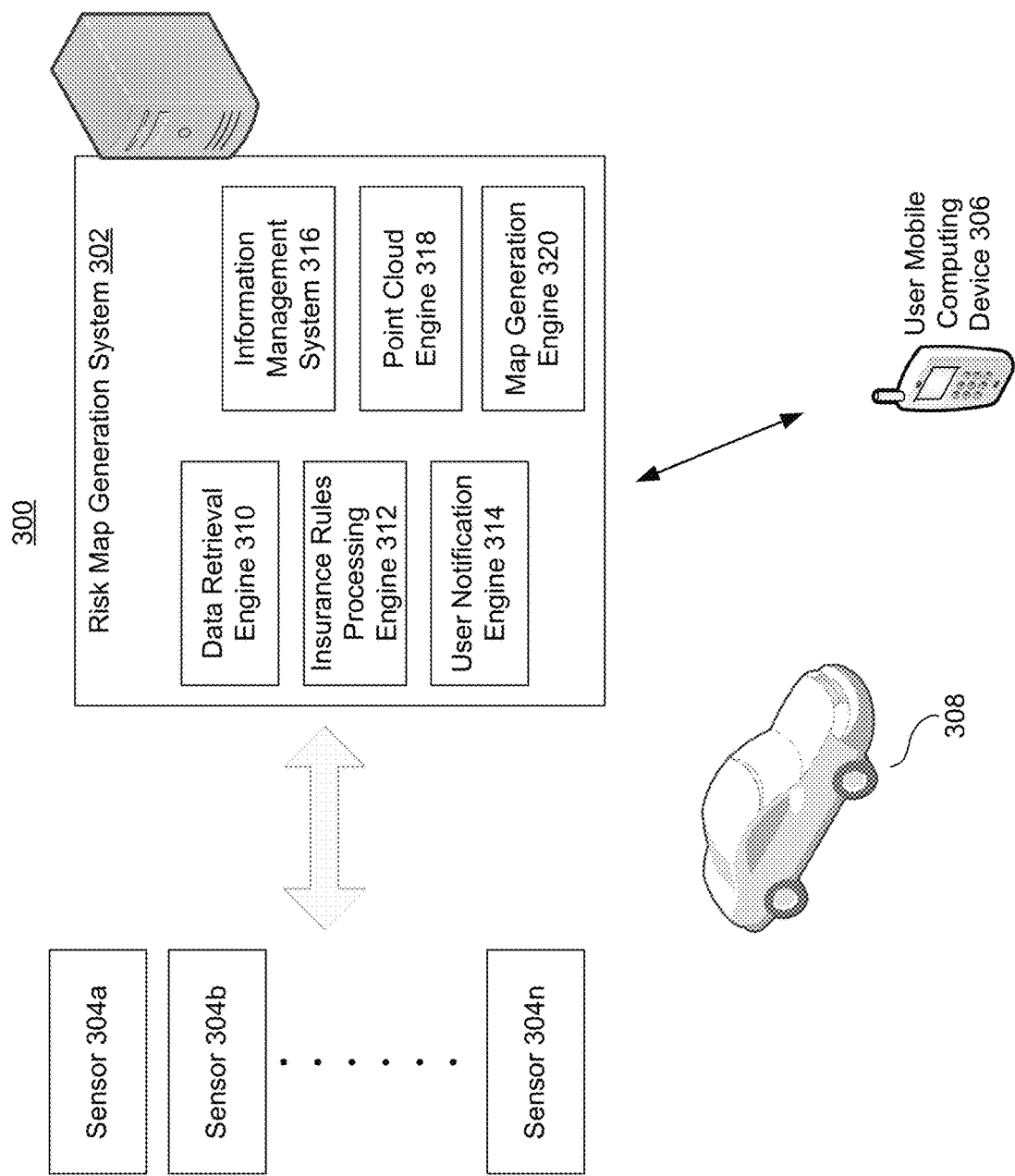
FIG. 3 depicts another example operating environment in accordance with aspects of the present disclosure.

FIG. 3 illustrates a computing system 300 for generating a risk map based on sensor information. Computing system 300 may include risk map generation system 302, sensor(s) 304, mobile computing device 306, and vehicle 308. In some embodiments, computing device 101 may comprise the risk map generation system 302. In other embodiments, risk map generation system 302 may comprise or be similar to the previously described computing devices 101, 141, or 151. In some aspects, sensor(s) 304 may be similar to the previously described sensor(s) 204. For example, sensor(s) 304 may be coupled to a vehicle 308. In some instances, vehicle 308 may be similar to the previously described vehicle 208. In some examples, a user mobile computing device 306 may be similar to the previously described computing devices 101, 141, or 151.

The risk map generation system 302 may receive sensor information and utilize the information to complete different tasks. For example, the risk map generation system 302 may receive sensor information from sensor(s) 304, and communicate with (e.g., transmit to and receive from) mobile computing device 306 in order to generate a risk map. In another example, the risk map generation system 302 may use received information and risk map generation system's modules to develop alerts that are included within the risk map, which may help to alert a driver of potential risks. A risk (e.g., potential risk) may comprise anything that may create a dangerous driving condition or increase a likelihood of a vehicle 308 getting into an accident. A risk map may comprise an image (e.g., JPEG, TIFF, BMP, etc.), a video (e.g., MPEG), a hologram, or other visual outputs for illustrating a road segment or route being traveled by a vehicle 308. The risk map may further include markers or other indicators of risks (e.g. risk objects). Risks may be any item, event, or condition that may pose a danger to a vehicle 308 while the vehicle 308 is on a trip. In various embodiments, the risk map may be a two-dimensional (2D) or a three-dimensional (3D) illustration. Further, in some embodiments, the risk map may dynamically change over time. The changes may be in accordance with geographic data indicating the vehicle's location and/or other data (e.g., speed data indicating a speed of the vehicle or odometer data indicating distance the vehicle traveled). In some embodiments, the risk map may be keyed or coded (e.g., certain symbols, colors, and the like that represent different risks or categorize the risk objects within the risk map).

In some embodiments, a risk map generation system 302 may create different risk maps for different devices or different users. For example, one risk map may be generated for a user of a vehicle 308 while a different risk map may be generated for a different user of another vehicle. The differences in the risk maps may depend on the past driving behavior of the different users (e.g., drivers) and may take into account that different things may pose different risks to different users. Although risk maps are often described herein as being displayed to drivers of a vehicle, it should be understood that risk maps may be generated for and displayed to pedestrians, joggers, runners, bike riders, motorcyclists, and the like. As another example, a risk map may be generated for a commercial truck driver. Under this example, different risk objects may be highlighted on the risk map such as known clearances, hanging power lines, and the like. In some embodiments, a risk map may be created for coordinating risk inside a building. For example, a risk map may be created to help a pedestrian navigate their way through a mall or an airport. In some instances, a risk map generation system 302 may generate a risk map that includes risk objects based on historical data. Historical data may comprise information about the prevalence of risk objects on a particular road segment over a given period of time. For example, a risk map may include risk objects based on where future risk may be located based on historical data or where risk is historically located on a road segment. In some aspects, a risk map generation system 302 may create a risk map based on pre-determined road segment information. For example, the risk map generation system 302 may receive road segment information for a segment of road a vehicle 308 is traveling on, and use the received road segment information to generate a risk map of the road segment. In some instances, a risk map generation system 302 may receive one or more risk maps from another computing device, identify which particular risk map of the one or more risk maps matches the segment of road a vehicle 308 may be traveling on, and generate a new risk map using the identified particular risk map along with sensor information obtained by the vehicle 308. In some embodiments, a risk map generation system 302 may create a risk map based on risk (e.g., risk objects). In some aspects, a risk map generation system 302 may create a risk map which provides different routes to a user to mitigate risk. For example, a generated risk map may contain different routes of travel based on the road segments a user may travel to arrive at their end destination. Under this example, each route may correlate to a different risk value based on the number and the type of risk objects located on each route.

In some aspects, the risk map generation system 302 may display a risk map to a user. In some examples, the risk map may be displayed on the exterior of the vehicle 308 (e.g., on the hood of a vehicle 308), on the interior of the vehicle 308 (e.g., on a display device, LCD screen, LED screen, and the like), or on the windshield of the vehicle 308 (e.g., heads-up display [HUD]). In some embodiments, a risk map may be displayed as a hologram, or on augmented reality (AR) glasses, or the like.

The risk map generation system 302 may comprise various modules for generating a risk map. For example, a risk map generation system 302 may include a data retrieval engine 310, an insurance rules processing engine 312, a user notification engine 314, an information management system 316, a point cloud engine 318, and a map generation engine 320.

The data retrieval engine 310 may request or receive information from other computing devices and sensors. For example, a data retrieval engine 310 may receive sensor information from sensor(s) 304, data from mobile computing device 306, and/or instructions/data from a user device or network device (not shown). A data retrieval engine 310 may receive different types of sensor information as those previously described. For example, a data retrieval engine 310 may obtain environmental information, vehicle information, weather information, and the like. In some aspects, a data retrieval engine 310 may receive and use the sensor information (e.g., x-plane information, y-plane information, and z-plane information) to determine whether a vehicle 308 is moving up or down.

The insurance rules processing engine 312 may receive and store data and/or instructions from an insurance provider on how to determine what poses a risk to a driver of a vehicle 308 (e.g. identify a risk object). In some instances, an insurance rules processing engine 312 may include a risk processing module for determining a risk value for a potential risk (e.g., risk object). For example, the risk processing module may evaluate a risk object and assign it a risk value. As another example, the risk processing module may assign a certain risk value to a road segment that is wet from rain, and assign a lower risk value to the road segment that is not wet from rain. In some embodiments, the risk processing module may calculate the risk value for a road segment, risk object, or point of risk by applying actuarial techniques. In some aspects, an insurance rules processing engine 312 may determine how to identify or present a risk object to a driver. In some aspects, an insurance rules processing engine 312 may process insurance policy information related to the user. For example, the insurance rules processing engine 312 may update a user's insurance information, adjust the user's insurance premium, adjust the user's insurance coverage, file a claim, or complete any other insurance task or process.

The user notification engine 314 may generate an alert on the risk map to help the user identify an upcoming and potential risk(s) on their route of travel. In some aspects, the user notification engine 314 may determine how to display a risk object to a user via the risk map. In some instances, a user notification engine 314 may generate alerts that may be provided to a user about adjustments to their insurance. In some embodiments, a user notification engine 314 may generate an insurance claim. In some aspects, a user notification engine 314 may develop risk values (e.g. a risk score), based on the sensor information. For example, a risk score may be a value associated with a particular road segment that is flat, and the risk score may be increased due to rain making the road wet. Under this example, the user notification engine 314 may assign a new risk score the road segment and notify the user that the risk score has changed. In some examples, a risk score may relate to a risk object being displayed in the risk map, and the risk score may alter the presentation of the risk object within the risk map to indicate a certain level of risk associated with the risk object. For example, if there is a pothole on the road, the risk map may display the pothole in a particular color or the pothole may be blinking on the risk map. In some embodiments, a risk object may be enhanced with an indicator which may be associated with a risk ranking system. A risk ranking system may perform a method for prioritizing or labeling the different levels of risk or potential trouble/danger associated with a risk object.

In some aspects, the indicator may be a color, an animation, a sound, a vibration, and the like for indicating the level of risk associated with a risk object. For example, a pothole may be displayed in yellow if it is a moderate risk to a vehicle 308 or displayed in red if it is a severe risk to the vehicle 308. In another example, one sound may be played for a low risk while a different sound may be played for a high risk. In another example, if a risk object is identified as being located at the front of the vehicle 308, then the floor or seat of the vehicle 308 may vibrate. In another example, if a risk object is identified as being located at the back/rear of the vehicle 308, then the back of the seat(s) of the vehicle 308 may vibrate. In some examples, if a risk object is identified as being located on the left side of the vehicle 308, then a sound may play out of the left speaker(s) of the vehicle 308. In some examples, if a risk object is identified as being located on the right side of the vehicle 308, then a sound may play out of the right speaker(s) of the vehicle 308.

Information management system 316 may organize and store all the information the risk map generation system 302 generates, transmits, and receives. In some aspects, the information management system 316 may store risk maps. In some instances, the information management system 316 may include a database for storing risk values associated with risk objects or road segments, or for storing risk values, risk objects, or road segments. In some embodiments, the information management system 316 may store routes (e.g., route information), risk objects (e.g., risk object information), and risk maps (e.g., risk map information) from other computing devices.

The point cloud engine 318 may generate point cloud information based on the sensor information received by the risk map generation system 302. For example, the point cloud engine 318 may generate point cloud information when the sensor(s) 304 sends signals in every direction, and the signals hit an object(s) and bounces back. In some examples, the point cloud engine 318 may be able to determine what an object is, from receiving a few data points from a signal that has hit an object. In some embodiments, the point cloud engine 318 may generate data to develop a risk map that simulates vehicle 308 traveling through a point cloud. In some aspects, a sensor(s) 304 may obtain video data, and the point cloud engine 318 may map a point cloud from the video data. In some instances, the point cloud engine 318 may obtain point cloud information using different frequencies of data collection. In some embodiments, the point cloud engine 318 may create point cloud images which may be used to generate a risk map. In some aspects, the point cloud engine 318 may generate point cloud images or figures that may be used to represent risk objects. In some instances, the point cloud images or figures may be displayed within the risk map. In some embodiments, the point cloud engine 318 may generate images or figures that are scaled (e.g., the scaling may be accurate to a centimeter). In some aspects, the point cloud engine 318 may obtain sensor information to generate figures represented by data points that may be mapped to a coordinate system (e.g., X, Y, and Z coordinates). In some embodiments, the point cloud engine 318 may create point clouds using a three-dimensional scanner. In some aspects, point cloud images may be gathered at the same time that video sensor data may be acquired. The video sensor data may include video stills (e.g., framing) that may be mapped to a point cloud, which may act as a mesh for holding an image. Any of the various programs and tools for mapping video to LIDAR gathering point clouds may be used.

The map generation engine 320 may collaborate with the other previously mentioned engines and systems to develop a risk map. In some aspects, the map generation engine 320 may output or display a risk map that may comprise information about the environmental surroundings of a vehicle 308 and the risks associated with the surroundings of the vehicle 308 as the vehicle 308 travels along a road segment. For example, the risk map may include the road segment a vehicle 308 is traveling on, along with the characteristics of the road segment, e.g., the trees, the buildings, and the weather conditions of the environment encompassing the road segment. In some examples, the map generation engine 320 may develop a three-dimensional and/or virtual world risk map. In some embodiments, the map generation engine 320 may retrieve GPS data and combine the GPS data with data from other engines and systems of the risk map generation system 302 to develop a risk map. In some embodiments, the risk map, which the map generation engine 320 creates, may not reflect reality (e.g., the risk map may be distorted). In some instances, a map generation engine 320 may assemble a risk map that augments reality in order to show a visual representation of the vehicle's 308 environment.

The engines/modules/systems 302, 310, 312, 314, 316, 318, and 320 may, individually or in combination, comprise one or more processors and memory storage devices (as previously described with reference to FIG. 1) for executing instructions causing one or more computing devices to execute the operations and/or tasks previously described with respect to items 302, 310, 312, 314, 316, 318, and 320.

Figure 4:
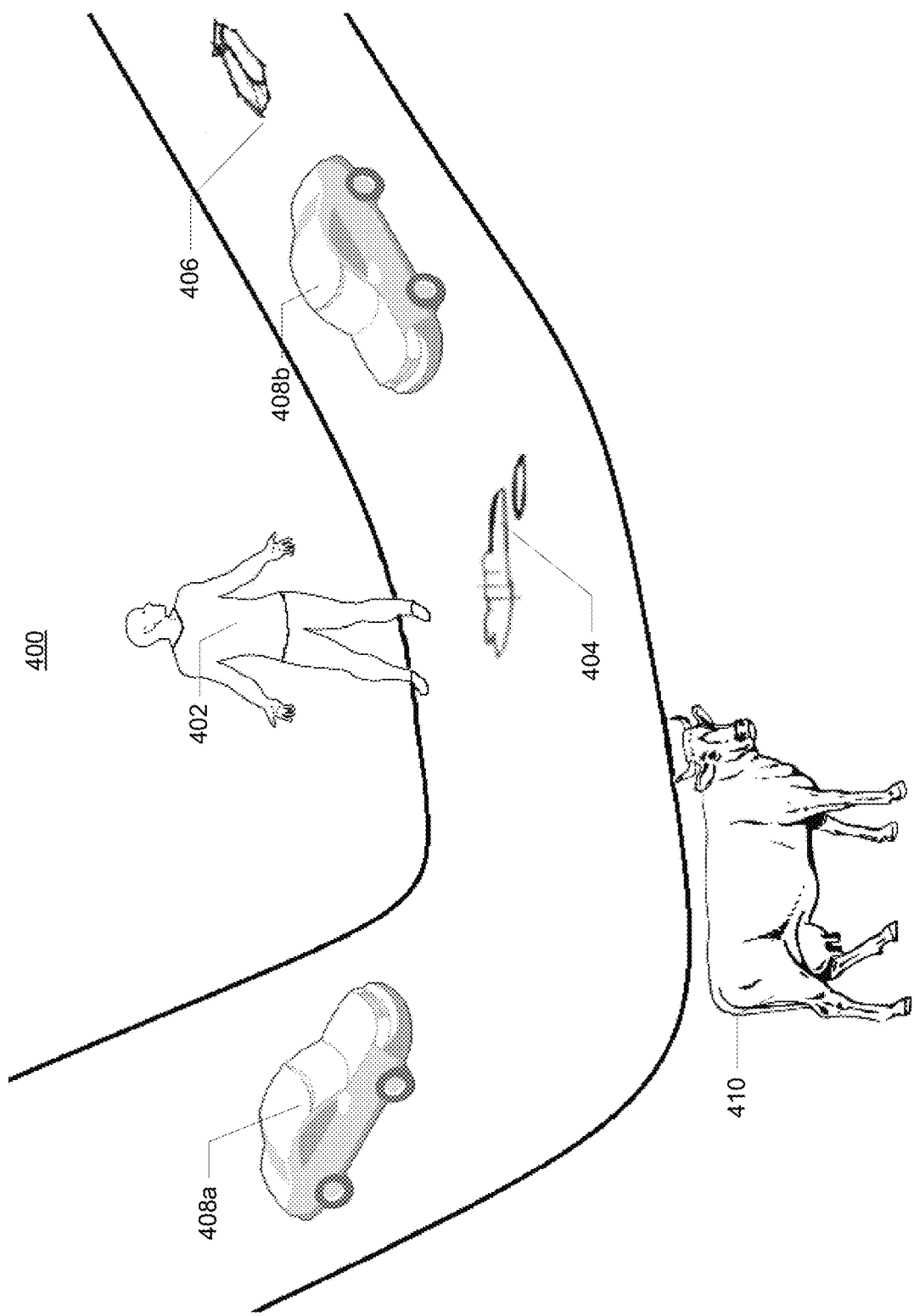
FIG. 4 depicts an illustrative user interface that may be displayed in accordance with aspects of the present disclosure.

FIG. 4 illustrates a user interface 400. The user interface 400 may be displayed to a user and may illustrate aspects of a risk map. The user interface 400 may comprise images or figures. For example, the user interface 400 may include images of a pedestrian 402, an oil slick 404, a pothole 406, a vehicle(s) 408, and/or an animal 410. In some aspects, FIGS. 402, 404, 406, 408, and 410 may be point cloud images. In some instances, the interface 400 may be a point cloud interface. In some aspects, these images may indicate a risk of the road segment or route being travel by a vehicle(s) 408. In some examples, the location of these images within the user interface 400 may be determined based on the sensor information received by risk map generation system 302.

In some aspects, the user interface 400 may be displayed in a perspective view of the user (not shown) (e.g., the same view a user may see while operating a vehicle 408). In some examples, the user interface 400 may display all risk objects relative to a vehicle (e.g., in front, in back, on the either side, below, and above the vehicle 408). Although the user interface 400 may be shown as a two-dimensional image in FIG. 4, in some embodiments, the user interface 400 may be three-dimensional. In other embodiments, the user interface 400 may be displayed on the inside or outside of the vehicle(s) 408. For example, the user interface 400 may be displayed on the windshield of the vehicle(s) 408 or on the hood of the vehicle(s) 408. In some examples, the user interface 400 may be a heads-up display unit (HUD). In some examples, the user interface 400 may be displayed on a computing device located on the interior of the vehicle 408 (e.g., on a screen on the dashboard of the vehicle or on a screen of a smartphone of the driver or passenger in the vehicle). The user interface 400 may be configured for display on various display screens (e.g., LED screen, LCD screen, plasma screen, holographic display, and the like). In some aspects, user interface 400 may display the 3D risk map by displaying images on the mesh of a 3D space, or as a sign (e.g., tip, waring, compliments, etc.) in a point cloud augmenting a 3D view (for example, like a sign that pops out of the ground or as emojis). These tips, warnings, compliments may be different in color, use animation, flashing, or appear in a 3D space on a heads-up 2D or 3D display. For example, a sign that reads "Deer!" may appear within the 3D risk map above an image of a deer (or an emoji of a deer) within the 3D risk map. Other techniques for updating and displaying a 3D risk map or objects within the 3D risk map may be similar to images and figures where photoshop filters are used (e.g., blurring what doesn't matter, sharpening what does matter, and adjusting contrast/brightness on visual data). In some examples, expressing a risk object in a 3D environment may be haptic feedback from a handset, using focused audio to express a message (like bass going through a port), puffs of warm or cold air, and air with different scents.

In some embodiments, 3D printers may be used for reconstructing accidents or simulations. In some cases, an insurance provider may use the reconstructed accidents or simulations generated by the 3D printer to determine how to process an insurance claim. In some instances, the reconstructed accidents or simulations generated by the 3D printer may be supplied to drivers of vehicles that may have been in the accidents.

Figure 5:
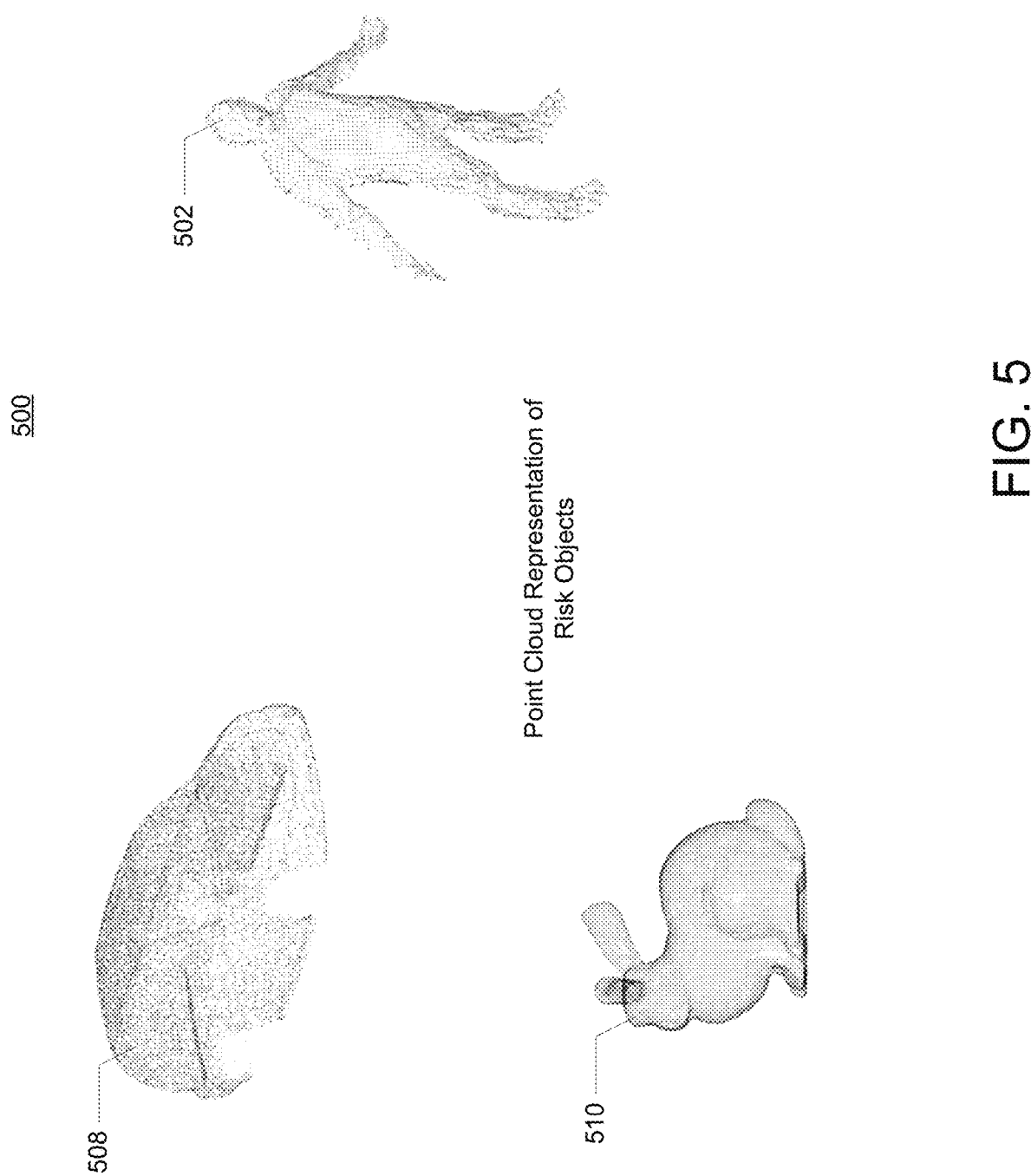
FIG. 5 depicts illustrative images that may be displayed in accordance with aspects of the present disclosure.

FIG. 5 illustrates examples of point cloud images. Such point cloud images may appear on a risk map. In some aspects, the images on a risk map may be point cloud representations of items deemed to pose a risk to the driver and/or vehicle. By way of example, FIG. 5 illustrates point cloud representations of several objects that may pose a risk: a point cloud representation of a vehicle 508, a point cloud representation of a pedestrian 502, and a point cloud representation of an animal (e.g., bunny) 510. Such point cloud images may appear in a user interface (e.g., user interface 400). The point cloud images may represent risks located on or around the road segment or route a vehicle is traveling. For example, a pedestrian or animal may be on the side of a road on which the vehicle is traveling, and thus, the point cloud representation of the pedestrian 502 and/or point cloud representation of the animal 510 may appear along the road segment within the risk map. In some examples, the positioning of these point cloud representations may correspond to their actual positions with respect to the road the vehicle is traveling on. In some aspects, the point cloud risk objects may be color-coded or keyed to alert the driver of a potential risk and the severity of the potential risk. For example, pedestrian 502 may be displayed in red within the risk map to indicate there may be a high risk the pedestrian may get in the vehicle's way, while animal 510 may be displayed in yellow indicating there may be a moderate risk the animal may get in the vehicle's way. Objects may be deemed to be high risk depending on the amount of damage they might cause a vehicle, because of their size or type (e.g., a deer may cause more damage than a squirrel so a deer may be displayed in a way to indicate that it poses a higher risk), or depending on the likelihood they might contact the vehicle (e.g., a deer might be more likely to hit a vehicle than a pedestrian who would use common sense to stay out of the path of the vehicle). Distance from the road may also contribute to the level of risk associated with an item. For example, an animal closer to the road may be displayed as posing a higher risk than an animal farther from the vehicle. In some embodiments, the risk objects may be linked to a sound or vibration to alert the user of a potential risk. For example, if a pedestrian 502 appears on the risk map, then a beeping sound may play over the vehicle's speakers to indicate a high risk. As another example, if an animal 510 appears on the risk map, then the driver's seat or the steering wheel of the vehicle may vibrate.

Figure 6:
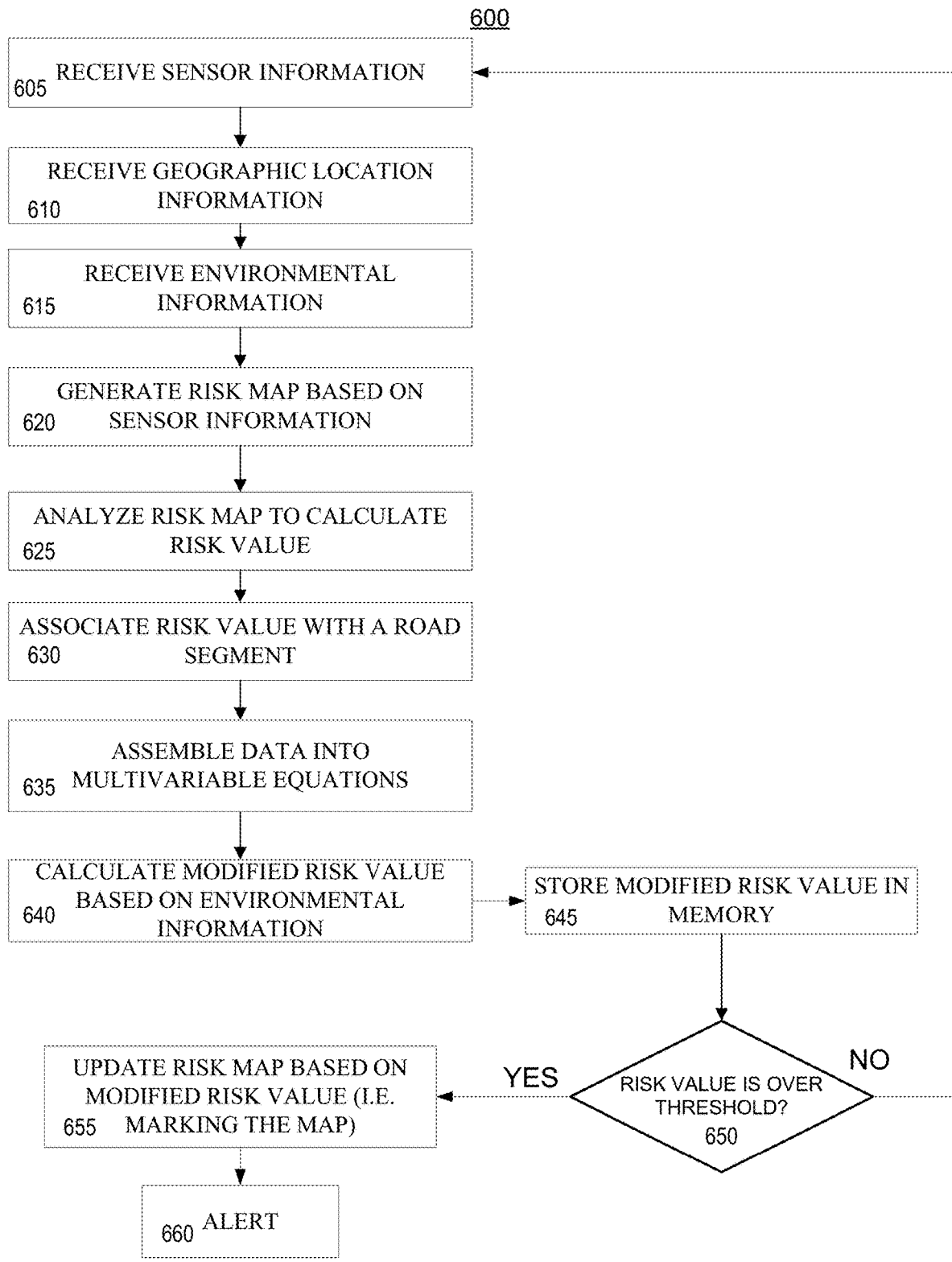
FIG. 6 depicts a flowchart of an example process in accordance with aspects of the present disclosure.

FIG. 6 illustrates a method for generating a risk map and an alert that may be provided to a user. The method may begin at step 605. At step 605, a risk map generation system 302 may receive sensor information from various sensors (e.g. sensor(s) 304). In some aspects, the risk map generation system 302 may store the received sensor information. In some examples, the sensor information may be the same as the sensor information previously described. In some embodiments, the risk map generation system 302 may receive sensor information from mobile computing device 306, a network device, or other computing devices. After step 605, the method may proceed to step 610.

At step 610, a risk map generation system 302 may receive geographic information (e.g., geographic location information). In some embodiments, the risk map generation system 302 may receive the geographic location information as part of the sensor information. In some aspects, the risk map generation system 302 may receive the geographic location information from a GPS device installed in a vehicle, mobile computing device 306, or another computing device. For example, in step 610, the risk map generation system 302 may receive GPS coordinates from a mobile phone of a driver of a vehicle via a cellular backhaul. In some instances, the geographic location information may comprise the same geographic location information as previously described. For example, the geographic location may comprise latitude and longitude coordinates of vehicle 308. After step 610, the method may proceed to step 615.

At step 615, the risk map generation system 302 may receive environmental information. In some embodiments, the risk map generation system 302 may receive the environmental information from a mobile computing device 306 or another computing device located in or on the vehicle. Additionally, or alternatively, the risk map generation system 302 may receive environmental information from a network device (e.g., a third party server, such as a server of a weather reporting organization). In some instances, the network device may be a computing device or a server similar to the risk map generation system 302, and may be operated by an insurance company. In some examples, the network device may contain environmental information about various routes, various road segments, various risk objects, and/or various risk maps that may be related to a route that a vehicle 308 may be traveling along. In some instances, the environmental information may comprise data about routes, road segments, risk objects, and/or risk maps. In some examples, the environmental information may be similar to environmental information previously described. In other embodiments, the risk map generation system 302 may receive environmental information from another computing device (system) associated with a different vehicle. In another embodiment, the risk map generation system 302 may receive environmental information regarding a road segment, via a computing device responsible for tracking the conditions of the road segment. In some embodiments, the risk map generation system 302 may receive environmental information from a structure/infrastructure (e.g. building, bridge, railroad track, etc.) via a computing device configured to monitor the structure. After step 615, the method may proceed to step 620.

At step 620, the risk map generation system 302 may generate a risk map based on the received information, individually or combined, from steps 605, 615, and 620. In some embodiments, the risk map generation system 302 may generate a risk map using sensor information. In some aspects, the risk map generation system 302 may analyze and manipulate the sensor information in order to create images, figures, and the like that represent a map or an environment that a vehicle 308 may be traveling through. In some instances, the manipulation of sensor information may comprise interpreting input information (e.g., sensor information) and reconstructing the sensor information in a way it may be used to generate an image, an object, or a virtual environment. In some embodiments, the risk map generation system 302 may convert the sensor, geographic location, and/or environmental information into point cloud information that may be used to create a point cloud map or a point cloud figure. In some examples, the point cloud figure or map may be used to generate a virtual world that resembles the environment a vehicle 308 may be traveling through. The risk map generation system 302 may generate a risk map using one or more point clouds representing objects (e.g. pedestrians, animals, buildings, etc.). In some embodiments, the risk map generation system 302 may generate a risk map by superimposing point cloud images into a virtual world. In some aspects, the risk map generation system 302 may generate a risk map using risk objects, risk values, road segments, and/or other risk maps. In some embodiments, risk map generation system 302 may generate a risk map using road segments, risk objects, and risk maps received from other computing devices. In some aspects, risk map generation system 302 may generate the risk map using sensor information and/or received information (e.g., data received by the risk map generation system 302 from other devices). For example, the risk map generation system 302 may generate a risk map using only the sensor information related to the physical attributes of the road segment being traveled by the vehicle 308. As another example, the risk map generation system 302 may generate a risk map using physical attributes of a road segment the vehicle 308 is traveling on combined with environmental information of the road segment, such as information indicating the current weather. For example, if it is raining the risk map may depict rain drops. In some examples, the heavier the rain, the more rain drops there are depicted in the risk map. In view of this disclosure, it will be understood that the risk map may be generated in various ways. After step 620, the method may proceed to step 625.

At step 625, the risk map generation system 302 may analyze the risk map and calculate a risk value. In some aspects, the risk value may be represented by a risk score. In some embodiments, the risk map generation system 302 may calculate the risk value for a road segment, risk object, or point of risk by applying actuarial techniques to the sensor information that may be received from sensors 304. In other examples, risk map generation system 302 may calculate the risk value by applying actuarial techniques to the information that may be received by the risk map generation system 302. In some embodiments, the risk map generation system 302 may calculate the risk value based on the likelihood of a risk object causing the vehicle to get in an accident. In some aspects, the risk map generation system 302 may calculate the risk value using only road information. For example, the risk value may be calculated based on only the physical attributes of the road. In some embodiments, the risk map generation system 302 may calculate the risk value using only the sensor information. In some instances, risk map generation system 302 may analyze a risk map to calculate a risk value as previously described with regards to FIG. 3.

After calculating a risk value at step 625, the risk map generation system 302 may associate the road segment a vehicle is traveling on to the risk value at step 630. In some aspects, associating the risk value may include analyzing the road segment or risk map the vehicle 308 is traveling along or through, identifying one or more risk objects and the characteristics of the one or more risk objects, and calculating a risk value based on the number of risk objects and the characteristics of the one or more risk objects located on the road segment or within the risk map. In some aspects, the risk map generation system 302 may have a list of predetermined risk objects correlated to a predetermine risk value. In some aspects, the risk map generation system 302 may have different groupings of risk objects (which may be categorized by the characteristics of the risk objects) correlated to predetermined values. In some embodiments, a user may be able to determine, categorize, or correlate risk objects to a user selected value. In some embodiments, a specially configured or programmed server or computing device of an insurance provider that manages the computing system may rank, prioritize, or correlate the risk objects to a selected value. For example, all risk objects located on the side of the road may have a risk value of 10, while all risk objects located on the road may have a risk value of 20. In some aspects, the risk value assigned may represent the likelihood of a risk object causing an accident. For example, a pothole with a 2 ft diameter may get a higher risk value than a pot hole with a 1 ft diameter. After step 630, the method may proceed to step 635.

At step 635, the risk map generation system 302 may assemble risk data into multivariable equations. For example, the risk map generation system 302 may use the data (identified at step 630) to determine a risk value of an object or a segment of road on the risk map based on predetermined equations. The equations may be configured for different information inputs which may affect the risk value assigned to a risk object, risk map, and/or road segment. For example, one equation may use sensor data while another equation may use the sensor data, environmental data, and geographic location data to determine a risk value. In some instances, a network device or insurance provider's server may generate and determine the multivariable equations. In some embodiments, the multivariable equations may be generated using actuarial techniques. Once the risk map generation system 302 assembles the received information into multivariable equations, the method may proceed to step 640.

At step 640, the risk map generation system 302 may calculate a modified risk value based on environmental information and/or other received information. For example, the risk map generation system 302 may use the determined risk values from step 625 and use the multivariable equation from step 635 to use additional received data (e.g., geographic location information and/or environmental information) to calculate a modified risk value. As another example, a risk value determined at step 625 may be adjusted. Under this example, the risk map generation system 302 may adjust a risk value due to a new condition (e.g. snow on the road). Due to the snow, risk map generation system 302 may use the multivariable equation to determine that the previous risk value needs to be modified. Upon completion of step 640, the method may proceed to step 645.

At step 645, the risk map generation system 302 may store the modified risk value in memory. In some aspects, the modified risk value may be correlated to mark or enhance a particular risk object, road segment, and/or risk map. The particular risk object, road segment, or risk map may be updated and assigned the new modified risk value. The updated risk object, road segment, or risk map with its updated risk value may be stored by the risk map generation system 302 into a database. In some aspects, the database information may be shared with other computing devices or be used to generate other risk maps with similar road segment characteristics. After step 645 is completed, the method may proceed to step 650.

At step 650, the risk map generation system 302 may determine if the risk value (e.g. risk score) is over a threshold. The threshold value may be determined by a user or a system provider (e.g., insurance company/provider). Also, the threshold value may be adjusted on a case-by-case basis (e.g., driver by driver basis), or may be predetermined. If the risk map generation system 302 determines that the risk value is not over the threshold, the method may proceed to step 605. If the risk map generation system 302 determines that the risk value has exceeded the threshold, then the method may proceed to step 655.

At step 655, the risk map generation system 302 may update the risk map based on the modified risk value. In some aspects, updating the risk map may comprise marking risk objects within the risk map with indicators. The indicators may function to help alert the driver of potential risks. In some aspects, updating the risk map may comprise adding risk objects to or removing risk objects from the risk map. In some embodiments, the indicator may comprise color-coding the risk map. In some examples, the indicator may result in enhancing a risk object with a color, a sound, or an animation. In some instances, an indicator is similar to the indicator as described with reference to FIG. 3. After step 655 has completed, the method may proceed to step 660.

At step 660, the risk map generation system 302 may alert the user of a vehicle. The alert may be an indicator or enhancement to a risk object, road segment, and/or risk map. The alert may be any previously described indicator (with reference to FIG. 3). In some aspects, the alert may identify or indicate to the user of a vehicle that there is a potential risk and what that potential risk may be. In some examples, the risk map generation system 302 may display the risk object, road segment, and/or risk map to a user. In other examples, risk map generation system 302 may provide the user with an audio alert. After step 660 has completed, the method of FIG. 6 may be repeated so that another risk map may be generated or so that the risk map is continually and/or dynamically updated to provide a virtual world representation of the surroundings of the vehicle as the vehicle moves.

Figure 7:
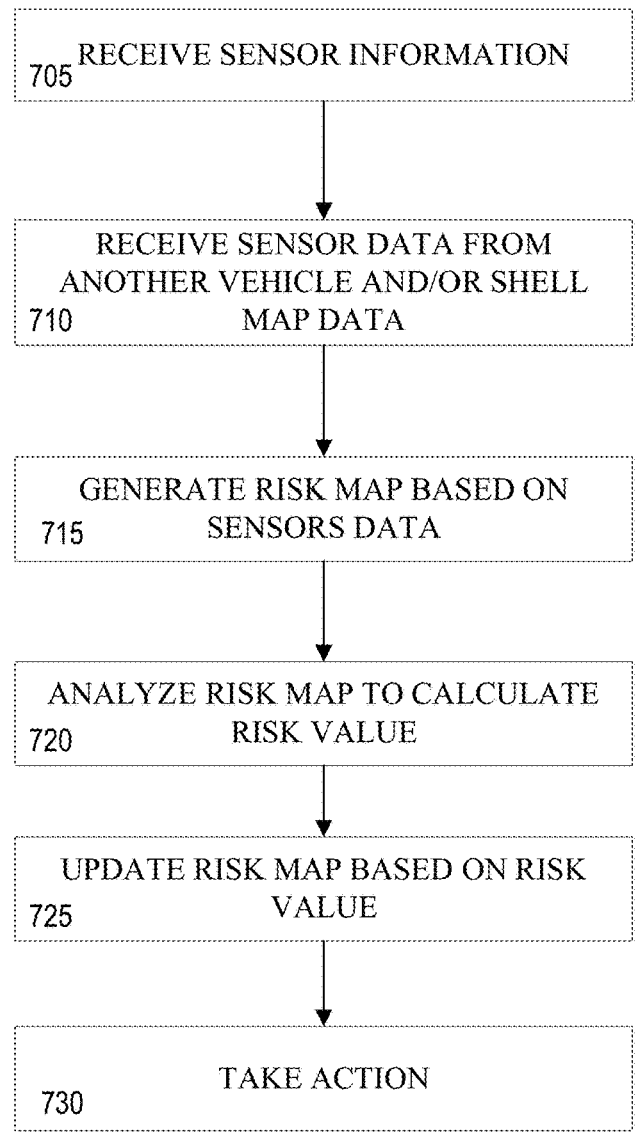
FIG. 7 depicts a flowchart of an example process in accordance with aspects of the present disclosure.

FIG. 7 illustrates a method for generating a risk map and determining an action to be taken based on the generated risk map. The method may begin at step 705. At step 705, the risk map generation system 302 may receive sensor information as previously described with reference to FIG. 6. Once step 705 has been completed, the method may proceed to step 710. At step 710, risk map generation system 302 may receive additional sensor data from another computing device associated with another vehicle. For example, the risk map generation system 302 receiving sensor data associated with the vehicle 308 may receive additional sensor data from another computing device associated with a different vehicle (different from vehicle 308). As another example, the risk map generation system 302 may download the additional sensor information from a network device. In some embodiments, the risk map generation system 302 may receive additional sensor data from a plurality of different computing devices respectively associated with a plurality of different vehicles. In some aspects, the additional sensor data may comprise a risk map containing shell map data (e.g., a risk map with only road information), a baseline template of a risk map for a road segment, or the like. In some aspects, the baseline template may include a risk map with a risk value for a road segment or a risk object. In some instances, the network server may be owned and operated by an insurance provider. In some embodiments, additional sensor data may comprise risk objects, road segments, or risk maps. In some examples, the additional sensor data may comprise any of the previously described information. After step 710 has completed, the method may proceed to step 715.

At step 715, the risk map generation system 302 may generate a new (e.g., updated) risk map based on the received sensor data and the additional sensor data. In some aspects, the risk map generation system 302 may generate a new (e.g., updated) risk map by using an existing risk map from the additional sensor data and updating the existing risk map with the new sensor information obtained in step 705. The risk map may be generated in various manners as disclosed herein. In some embodiments, the risk map generation system 302 may generate a three-dimensional (3D) point cloud risk map or a two-dimensional map with 3D point cloud images overlaying the map. After step 715 has completed, the method may proceed to step 720.

At step 720, the computing device may analyze the risk map to calculate a risk value as previously described (e.g., with reference to FIGS. 3 and 6). Once step 720 has completed, the method may proceed to step 725. At step 725, the risk map generation system 302 may update the risk map based on the risk value from step 720. In some aspects, risk map generation system 302 may analyze the risk map by pattern matching. For example, pattern matching may comprise comparing the risk map based on the additional sensor data at step 710 with a risk map generated using the sensor information at step 705. As another example, pattern matching may comprise comparing sensor information from step 705 with additional sensor data received in step 710. In some embodiments, the updated risk map may determine and provide alternative routes for a user to travel that contain less risk (e.g. a lower risk value may be associated with the alternative route). In some embodiments, the risk map generation system 302 may display the updated risk map to a user. After completion of step 725, the method may proceed to step 730.

At step 730, the risk map generation system 302 may use the updated risk map to complete insurance tasks. For example, the updated risk map may be used to adjust a user's insurance premium, modify a user's insurance coverage, file a claim, pay a claim, report or record an accident, offer different rates for insurance based on routes traveled, etc. In some aspects, a risk map generation system 302 may use the updated risk map to offer a user a new or alternative route for traveling to their destination. For example, the risk map generation system 302 may offer different routes based on risk values to the user in order for the user to reach their destination. In some embodiments, a risk map generation system 302 may provide the updated risk map to notify pedestrians, motorcyclist, cyclist, and the like. In some examples, a risk map generation system 302 may use the updated risk map to notify emergency responders of potential risks on particular roads. The risk map generation system 302 may be able to provide first responders with a plurality of possible routes to a predetermined destination and rank them based on risk value, time, distance, traffic, and other safety and travel factors. In other examples, a risk map generation system 302 may use the updated risk map to influence autonomous and semi-autonomous vehicles. For example, the risk map generation system 302 may collaborate with a vehicle's systems in order to slow the vehicle down or to help the vehicle avoid an accident, based on the updated risk map.

In some aspects, users may be assigned a consumption score based on the updated risk maps. A consumption score may be a value correlated to a user's exposure to risk while operating a vehicle. In some instances, the updated risk map may be used to update the consumption score. In some examples, the consumption score may be affected by the route the user chooses to take. In some aspects, the consumption score may be used to characterize a user. For example, a user with a low consumption score, meaning they choose to travel safer routes, may be less likely to commit fraud. On the other hand, a user with a high consumption score, meaning they choose to travel more hazardous routes, may be more likely to commit fraud. In another example, the consumption score may be able to be used in place of a credit score.

In some embodiments, the updated risk map may be used by a paid driver, collaborative driver, or delivery driver (e.g., taxi, ride-share, package delivery service, etc.) Under these examples, the updated risk map may affect the price of the services. For example, a taxi driver may adjust his fare, based on the updated risk map, if a service user selects a route with a higher risk value than an alternative route. As another example, a delivery service may charge less for their services if their drivers travel the safest routes to their destinations, based on the updated risk map. In some embodiments, paid drivers may be able to offer pricing by route, based on the updated risk map. In some instances, a user may be able to select a paid driver based on the driver's consumption score.

Figure 8A:
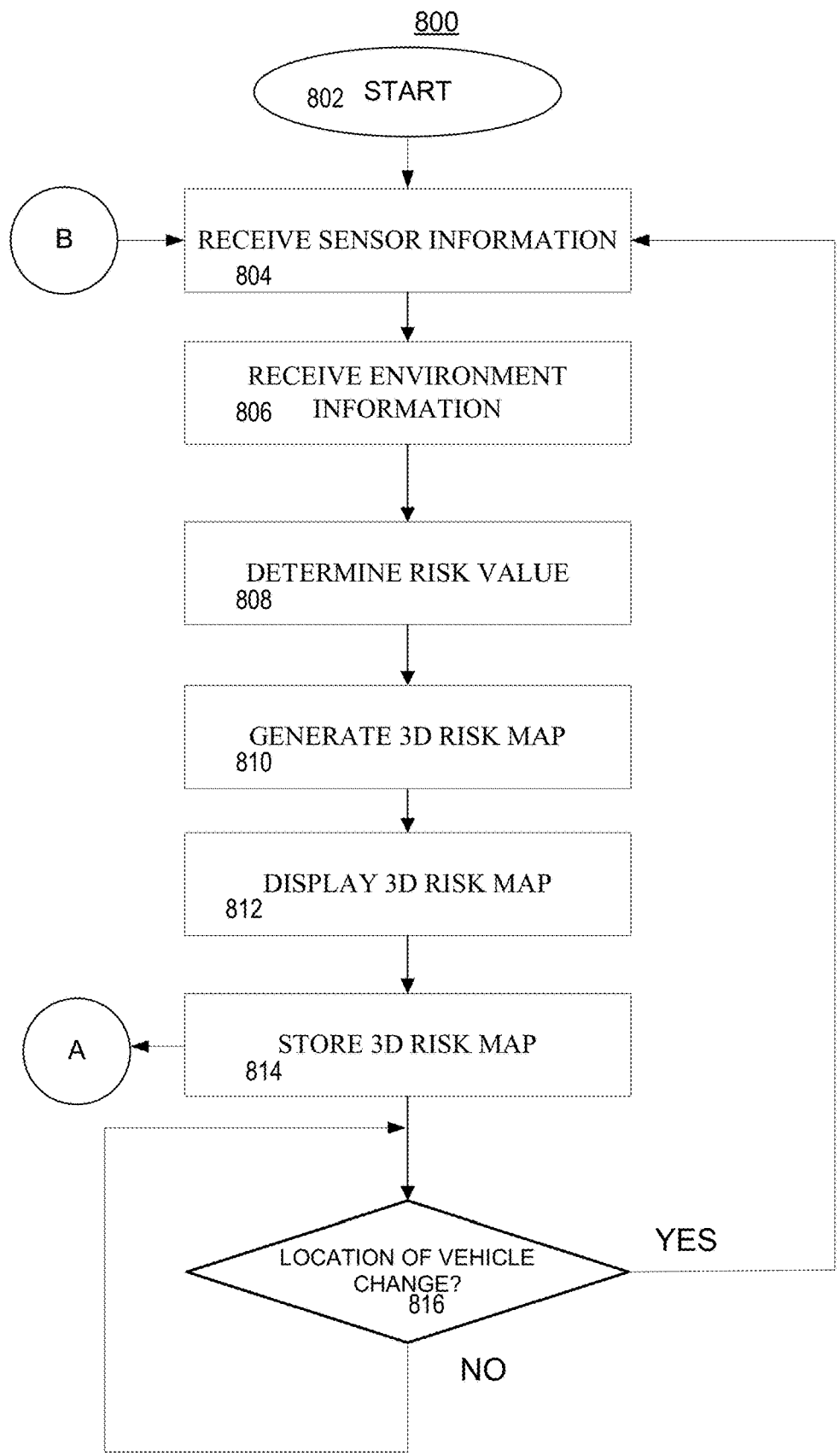
FIG. 8A depicts a flowchart of an example process in accordance with aspects of the present disclosure.
Figure 8B:
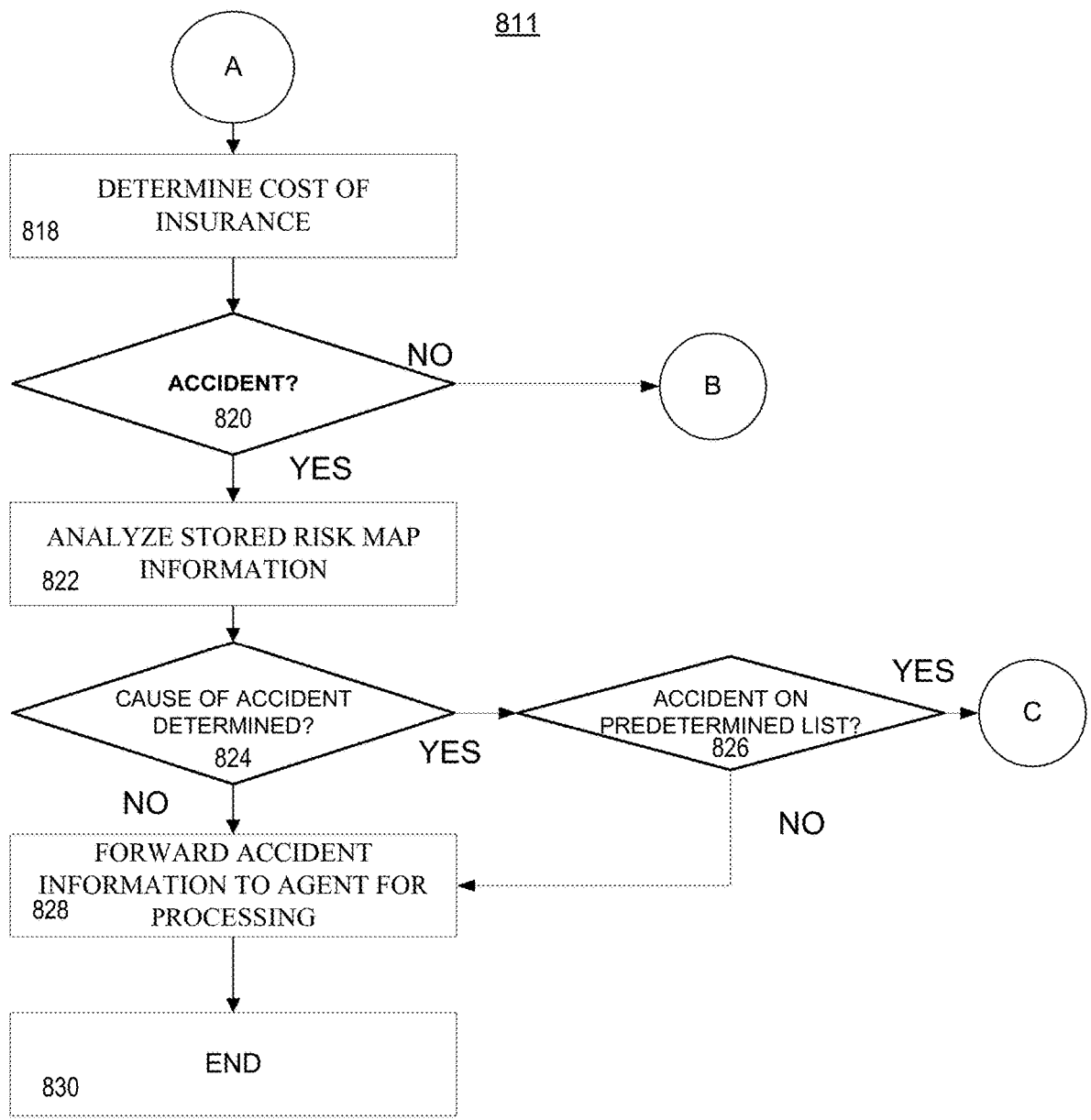
FIG. 8B depicts a flowchart of an example process in accordance with aspects of the present disclosure.
Figure 8C:
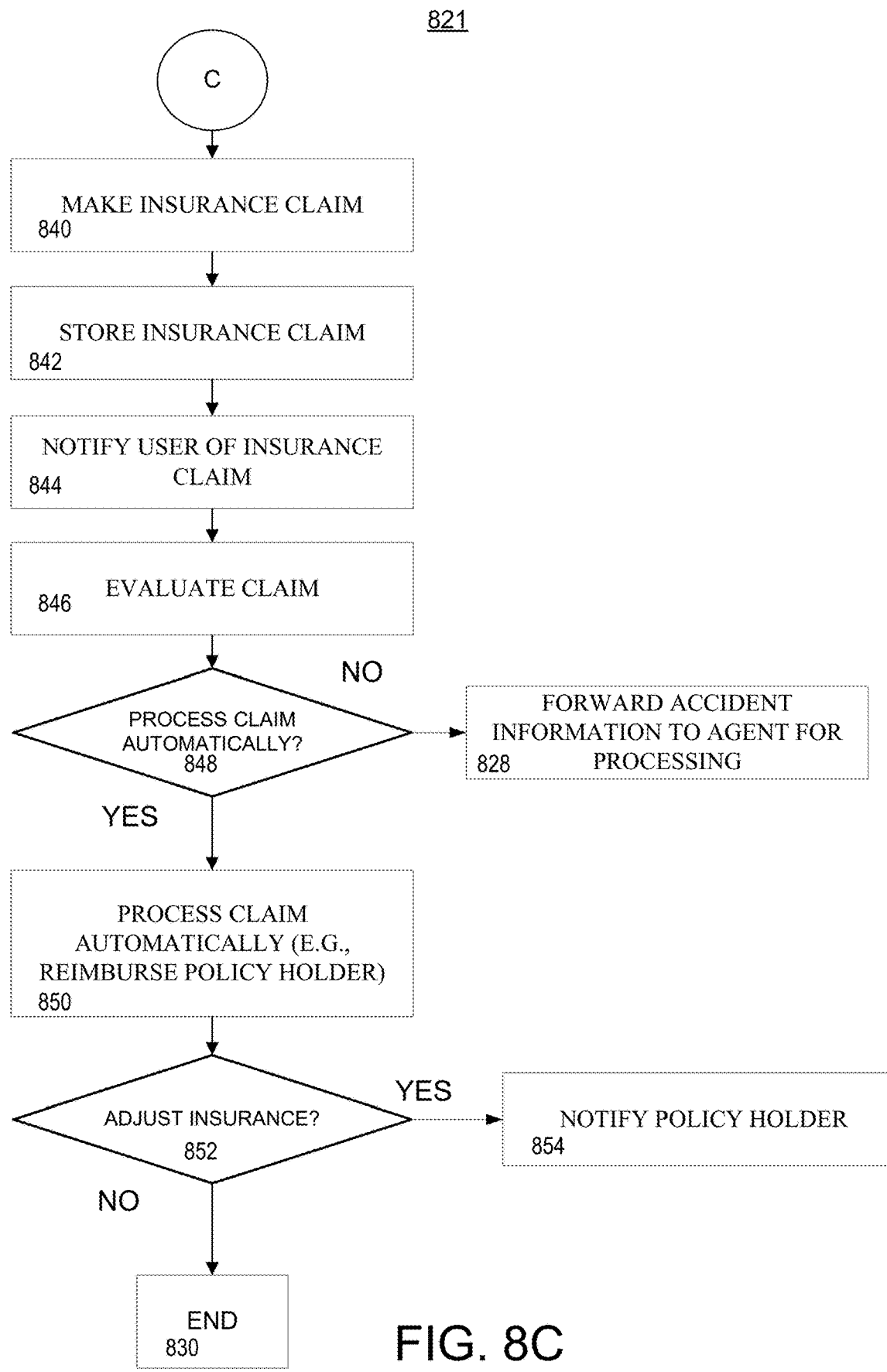
FIG. 8C depicts a flowchart of an example process in accordance with aspects of the present disclosure.

FIGS. 8A-8C illustrate a method for using the risk map to control how insurance claims may be processed. The method may begin at step 802 upon power up of a computing device (e.g., a mobile computing device within a vehicle or a server) or upon detection (e.g., by a computing device within the vehicle) that the vehicle is starting a trip or has started a trip. For example, the method may proceed to step 804 when it is determined that the vehicle is being driven or will be driven shortly (which may be determined by determining that the vehicle left a home, the vehicle has exceeded a certain speed, or the vehicle's engine has turned on). At step 804, the risk map generation system 302 may receive sensor information, as previously described. Upon completion of step 804, the method may move to step 806. At step 806, the risk map generation system 302 may receive environment information, as previously described. Following step 806, the method may continue to step 808.

At step 808 of the method, a risk map generation system 302 may determine a risk value for a segment of road a vehicle is traveling based on the received information. In some embodiments, a risk map generation system 302 may determine a risk value by analyzing the sensor information or environment information to identify one or more risk objects, analyzing the one or more risk objects, and determining a risk value based on the one or more risk objects. In some embodiments, the risk map generation system 302 may link the risk value(s) of the one or more risk objects to a particular road segment or risk map. For example, the risk map generation system 302 may receive sensor information and identify a pothole on the road. The risk map generation system 302 may evaluate the size, depth, and location of the pothole and determine a risk value for the road segment, based on that road segment containing the pothole. As another example, the risk map generation system 302 may receive sensor information and environment information, identify snow on the road and a pedestrian in a crosswalk, and determine a risk value for the road segment. In other examples, a risk map generation system 302 may download a risk map for a road segment from a server or plurality of servers. The risk map generation system 302 may update the downloaded risk map using sensor information and environment information it obtained at steps 804 and 806. For example, the risk map generation system 302 may receive a risk map of a road segment that a vehicle 308 is traveling along. The downloaded risk map may contain a risk value because a pothole is located on the road segment. The risk map generation system 302 may overlay an image on the downloaded risk map according to the obtained sensor information and environment information, e.g., adding an object indicating a wet road condition due to weather information indicating that it is raining. The risk map generation system 302 may calculate a new risk value of the road segment using an existing risk score and considering the other risk objects to calculate an updated risk score. After step 808, the method may proceed to step 810.

At step 810, the risk map generation system 302 may generate a 3D risk map using the sensor information, the environment information, and the determined risk values. In some instances, the risk map generation system 302 may generate a 3D risk map as previously described. In some embodiments, the risk map generation system 302 may generate a 3D risk map using point clouds. In some aspects, the 3D risk map may be generated using risk objects or road segments. In some instances, the 3D risk map may comprise a point cloud real-time virtual environment representing the route or road segment the vehicle 308 is traveling on and the vehicle's 308 surroundings (environment). After step 810, the method may continue to step 812.

At step 812, the risk map generation system 302 may display the risk map. In some aspects, the risk map generation system 302 may transmit the risk map to another computing device or mobile computing device 306 for displaying the risk map. In some aspects, a computing device may download the risk map from the risk map generation system 302 in order for the risk map to be displayed. In some aspects, the risk map generation system 302 may display a risk map to a user. In some examples, the risk map may be displayed on the exterior of the vehicle 308 (e.g., on the hood of a vehicle 308), on the interior of the vehicle 308 (e.g., on a display device, LCD screen, LED screen, and the like), or on the windshield of the vehicle 308 (e.g., heads-up display (HUD)). In some embodiments, a risk map may be displayed as a hologram, on augmented reality (AR) glasses, and the like. In some aspects, the risk map generation system 302 may display the risk map as previously described. Upon completion of step 812, the method may proceed to step 814.

At step 814, the risk map generation system 302 may store the risk map, the sensor information, the environmental information, and the determined risk values in a database. In some aspects, the information and risk values may be stored together (e.g., tied to a particular risk map or a particular road segment). In other aspects, the information may be stored independently and categorized by road segment and different characteristics of the information. For example, all data for a risk map related to a road segment traveled at night time may be stored together. In some embodiments, the risk map(s), sensor information, environment information, road segment(s), and risk value(s) may be transmitted to another device (e.g., insurance server) to be stored. In some aspects, the risk map(s), sensor information, environment information, road segment(s), and risk value(s) may be buffered. In some instances, the risk map(s), sensor information, environment information, road segment(s), and risk value(s) may only be stored for a certain amount of time. For example, the risk map(s), sensor information, environment information, road segment(s), and risk value(s) may only be stored for 30 days at a time. In some aspects, a user or a system owner (e.g., insurance provider) may determine how long the risk map(s), sensor information, environment information, road segment(s), and risk value(s) may be stored. In some instances, the risk map generation system 302 may store the risk map(s), sensor information, environment information, road segment(s), and risk value(s) as previously described. After step 814, the method may proceed to step 816.

At step 816, the risk map generation system 302 may determine if the location of a vehicle 308 has changed. If the location of the vehicle 308 has changed, the method may proceed to step 804. If the location of the vehicle 308 has not changed the method may stay at step 816. In some aspects, in order for the risk map generation system 302 to determine that the vehicle's 308 location has changed the vehicle 308 may need to move a certain distance past a threshold. The threshold may be a user selected threshold or a predetermined threshold. The threshold may be adjustable or fixed. In some embodiments, the risk map generation system 302 may receive information from other devices to determine if the vehicle 308 has moved. For example, the risk map generation system 302 may receive movement information from a vehicle telematics device. As another example, the risk map generation system 302 may receive movement information from a GPS device or mobile device. The GPS device may provide coordinates relating to the location of the vehicle 308 at a first point in time, and may provide different coordinates relating to the location of the vehicle 308 at a second point in time, thus, showing the vehicle 308 has moved. Following step 816, the method may proceed to step 818.

At step 818, the risk map generation system 302 may determine the cost of insurance based on the risk map. In some aspects, the cost of insurance may be determined based on the risk values associated with the risk map. The risk map generation system 302 may determine an insurance premium for a user based on the road segment traveled and the risk score associated with the road segment. The cost of insurance may be determined after a trip has been completed by adding up the different risk values associated with the risk map. In some aspects, the risk map generation system 302 may adjust the insurance premium for a user based on the risk values associated with the risk map. Upon completion of step 818, the method may proceed to step 820.

At step 820, the risk map generation system 302 may determine whether or not an accident has occurred. If an accident has not occurred, the method may proceed to step 804. If the risk map generation system 302 determines that an accident has occurred, then the method may proceed to step 822. The risk map generation system 302 may use accident information and/or sensor information to determine that an accident has occurred. For example, information from a LIDAR sensor may be evaluated to determine that the vehicle collided with another object. In another example, information from a sensor installed in the vehicle (e.g., original equipment manufacturer (OEM)), such as information indicating that an airbag was deployed, may be monitored to detect whether an accident occurred.

At step 822, the risk map generation system 302 may analyze the risk map information in order to determine the cause of the accident. The risk map generation system 302 may analyze the stored risk maps that were developed close to the time of the accident to determine the cause of the accident. The risk map generation system 302 may evaluate the risk objects located within the risk map at the time of the accident as well as the risk values associated with those risk objects. Following step 822, the method may proceed to step 824.

In step 822, the risk map generation system 302 may determine, based on the analyzing of the stored risk map, the cause of the accident. For example, if a risk object was located in front of a vehicle 308, and there is damage to the front bumper of the vehicle 308, then the risk map generation system 302 may determine there is a front-end accident. As another example, in response to determining that an accident has occurred, the risk map generation system 302 may attempt to determine what in the risk map is likely the cause of the accident. For example, knowing that there was an impact to the side of the vehicle, the risk map generation system 302 may evaluate the risk map just before (or at the same time or just after) the impact to identify which, if any, objects might have caused the impact. Then, in step 824, the risk map generation system 302 may determine whether the cause of the accident could be determined. In some cases, the risk map generation system 302 might not be able to determine the cause of the accident (e.g., no object was identified or multiple objects were identified as possible causes). In some embodiments, the analysis at step 822 may include determining a confidence score indicating a confidence that the risk map generation system 302 has in its determination of what may have led to the accident. In such embodiments, step 824 may include comparing the confidence score with a threshold to determine whether the risk map generation system 302 is confident enough in its determination. Different thresholds may be used for different causes of an accident or different drivers. If the cause of the accident is not determined (or the risk map generation system 302 is not confident in its determination of the cause), the method may proceed to step 828. If the cause the accident is determined (or the risk map generation system 302 has enough confidence in its determination), then the method may proceed to step 826.

At step 826, the risk map generation system 302 may determine whether the cause of the accident includes an accident listed on a predetermined list of accidents. The predetermined list may be formulated by an insurance provider. An insurance provider may determine which accidents can be automatically processed by the system, and add such accidents to the predetermined list. For example, an insurance provider may determine that collisions with objects rather than other vehicles, may be processed automatically, and thus, may be added to the list. In contrast, if the cause of the accident was contact with another vehicle, it might not be readily apparent which driver is at fault (and thus, which insurance company is responsible), and thus, such types of accidents might not be on the list. In some examples, the list may comprise an animal, poor road conditions (e.g., a pothole), a flat tire, and a chipped windshield. If the cause of the accident is not one on the predetermined list, the method may proceed to step 828. If the cause of the accident can be categorized as one of the types of accidents on the predetermined list, the method may proceed to step 840.

At step 828, the risk map generation system 302 may forward the accident information to an agent of an insurance company for processing. For example, the risk generation system 302 may transmit the risk map and all associated information (e.g., risk values, road segments, sensor information, etc.) to a server (e.g., a server operated by an insurance provider). In some embodiments, the risk map may be transmitted to a user device (e.g., mobile computing device 306) or a computing device associated with an insurance agent. Upon receiving the risk map, the insurance agent may be able to evaluate the damage to the vehicle 308 and determine the cause of the accident. In some examples, the risk map may be provided to a user device associated with the police.

At step 840, the risk map generation system 302 may construct an insurance claim. Here, the constructed insurance claim may be a particular data structure including various information used for processing insurance claims. The data structure may include, in association with each other, a driver's name, a policy number of an applicable insurance policy for the vehicle, a premium of the applicable insurance policy, a deductible of the insurance policy, an amount of the claim, an indication of an amount of damage to the vehicle as a result of the accident, an image of the damage, a description of the damage, the determined cause of the accident, a location of the accident, a date/time of the accident, a date/time of constructing the insurance claim, etc. The risk map generation system 302 may use accident information, sensor information, cause of the accident information, environmental information, and vehicle information to construct an insurance claim. The risk map generation system 302 may also use risk map information and risk values to help construct the insurance claim. Once the insurance claim has been made, the method may proceed to step 842.

At step 842, the risk map generation system 302 may store the insurance claim. In some aspects, the risk map generation system 302 may store the insurance claim information in a claims database. In some aspects, the computing device may transmit the insurance claim information to an insurance provider server or another computing device that may store the insurance claim information. In some embodiments, the insurance claim may be stored with all associated data (e.g., risk map(s), risk value(s), etc.) to the accident. In some examples, the risk map generation system 302 may store the insurance claim on an insurance provider's server or on a user device (e.g., mobile computing device 306). Upon completing step 842, the method may proceed to step 844.

At step 844, the risk map generation system 302 may notify a user by transmitting, to a user device, the insurance claim information. In some aspects, the risk map generation system 302 may transmit an alert to a user device to notify a user that an insurance claim has been made for the user. Such a service may be appreciated by customers. That is, customers may appreciate that a system has automatically placed an insurance claim so that they do not have to and can focus on other matters. Some customers may also be appreciative when the system automatically places a claim for them, because they may take comfort knowing that their insurance claim is being handled in a timely manner. In accordance with aspects of the present disclosure, notification of an insurance claim may take place within just hours, minutes, or seconds of the accident occurring. In some examples, the risk map generation system 302 may push a notification to the user. Additionally, or alternatively, a user may be able to use a mobile computing device 306 or another user computing device (e.g., desktop computer) to download insurance claim information from the risk map generation system 302. In light of the above, it should be understood that an insurance company/provider, using information from the risk map, may provide insurance claim status information on a website just minutes after a customer's vehicle is involved in an accident.

At step 846, the risk map generation system 302 may evaluate the claim by determining the cost of the claim. Evaluating the claim may require the risk map generation system 302 to determine the cost of the accident. The cost of the accident may be determined by evaluating the cost to fix the vehicle(s) 308, and cost of injury to any passenger(s) in the vehicle(s) 308. In some aspects, as part of the evaluation, the risk map generation system 302 may determine whether any property was damaged and a cost to fix the damaged property. In some embodiments, the risk map generation system 302 may analyze a user's insurance policy to determine a user's coverages, and determine the amount of the claim that may be covered by insurance and the amount of the claim that may have to be paid by the user. After step 846, the method may continue to step 848.

At step 848, the risk map generation system 302 may determine whether the claim is eligible to be processed automatically or whether the claim should be forwarded to an insurance agent/adjuster for processing. The determination in step 848 may include determining whether the cost of the insurance claim is below or above a threshold. In some aspects, the threshold of the cost of the insurance claim may be determined and provided by an insurance company/provider. In some instances, the threshold may be set by a user (e.g., driver involved in the accident, policy holder, etc.). For example, if the cost of a claim was $500, and the user's threshold was set to $1,000, then the claim is below the threshold and the claim may be eligible for automatic processing. If the value or cost the insurance claim is above the threshold value, the risk map generation system 302 may determine that the claim is not eligible for automatic processing at which point the method may proceed to step 828.

At step 828, the risk map generation system 302 may send the processing claim to an agent/adjuster of an insurance provider in order to complete the claim processing. The insurance agent/adjuster may decide that he/she needs to inspect the vehicle before settling the claim. For example, if the insurance agent/adjuster suspects foul play (e.g., insurance fraud), the insurance adjuster may wish to investigate the insurance claim. In an alternative embodiment, a user may select a threshold price for processing a claim. For example, if a user selects a claim processing threshold of $1000 and the value of the claim is $500, then the claim may not be processed (e.g., the user would be willing to pay for cost of the accident out of pocket). If the cost of the insurance claim is below the threshold value, the method may proceed to step 850.

At step 850, the risk map generation system 302 may automatically process the insurance claim. Such automatic processing may allow insurance companies to use their resources (e.g., employees such as insurance adjusters) efficiently. In some instances, step 850 may include reimbursing the user involved in the accident by electronically depositing money into a user's money account. In some aspects, the risk map generation system 302 may initiate a process for having a refund check sent to the user. In some aspects, the risk map generation system 302 may transmit reimbursement information to a server or computing device of the insurance provider of the user in order for the insurance provider to provide the user with a reimbursement. In some aspects, the risk map generation system 302 may provide claim information to an insurance provider or vehicle repair facility so a mechanic or place where the vehicle 308 may be repaired may be compensated. In some embodiments, processing the claim may include the risk map generation system 302 identifying and notifying a tow truck service and car repair facility for repairing the vehicle 308. In some examples, processing the claim may cause the risk map generation system 302 to send and receive information related to the insurance claim to various computing devices associated with repair facilities to acquire vehicle repair cost information. In some embodiments, processing the claim may include the risk map generation system 302 selecting a vehicle repair facility based on a user's preference or insurance provider's preference. Upon completion of step 850, the method may proceed to step 852.

At step 852, the risk map generation system 302 may determine whether or not to adjust the user's insurance. In some aspects, the risk map generation system 302 may adjust the user's insurance premium based on the accident. In some examples, the risk map generation system 302 may adjust the premium by raising or lowering the price. In other aspects, the risk map generation system 302 may adjust the coverages of the user's insurance policy. For example, the user's liability coverage and collision coverage may be increased or decreased. In some aspects, the risk map generation system 302 may determine whether or not to adjust a user's insurance based on the analyzing that occurred at step 822 of the method. In some instances, the risk map generation system 302 may adjust a user's insurance based on the claim processing of step 846. If the risk map generation system 302 determines not to adjust the user's insurance, the method may proceed to step 830, and the process may end. If the risk map generation system 302 determines to adjust the user's insurance, then the method may proceed to step 854. At step 854, the adjustment may be calculated and put into effect, and the user may be notified of the changes to their insurance policy. In some examples, the risk map generation system 302 may generate and transmit an email to be received by a user device. In other examples, the risk map generation system 302 may alert another server or computing device responsible for contacting the user and alerting them of the changes to their policy.

As with the methods of the aforementioned FIGS. 6, 7, 8A, 8B, and 8C, steps may be added, omitted, or modified to the methods of the FIGS. 6, 7, 8A, 8B, and 8C.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, where the described implementation includes software, it should be understood that a combination of hardware and software or hardware alone may be used in various other embodiments. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A system comprising:
   a server storing template map data;
   a global positioning system device configured to determine geographic location information for a vehicle;
   one or more sensors coupled to the vehicle and configured to detect sensor information; and
   a first computing device configured to:
      communicate with the server to receive the template map data comprising environmental information indicating environments along road segments for generating one or more three-dimensional (3D) virtual worlds representing the environments;
      communicate with the global positioning system device to receive the geographic location information;
      determine, based on the geographic location information, a particular road segment on which the vehicle is located among the road segments of the template map data;
      determine, based on a portion of the environmental information of the template map data corresponding to the particular road segment, a particular environment along the particular road segment;
      generate a particular 3D virtual world representing the particular environment along the particular road segment on which the vehicle is located;
      communicate with the one or more sensors to receive the sensor information;
      analyze the sensor information to identify one or more risk objects;
      generate one or more point clouds illustrating the one or more risk objects, respectively;
      generate, by superimposing the one or more point clouds into the particular 3D virtual world, a 3D risk map;
      display, using a display device of the vehicle, the 3D risk map;
      determine a risk score for at least one of the one or more risk objects;
      output a first alert if the risk score is above a predetermined threshold; and
      output a second alert if the risk score is below the predetermined threshold.

2. The system of claim 1 wherein the first computing device is configured to:
   determine a plurality of at risk objects based on the sensor information;
   determine a risk score for each of any additional ones of the plurality of at risk objects; and
   filter the plurality of at risk objects based on the risk score for each object to identify the one or more risk objects.

3. The system of claim 1, wherein the first computing device is further configured to:
   determine a route of travel of the vehicle;
   calculate a route risk score of the route; and
   update, based on the route risk score, the 3D risk map to indicate a level of risk associated with the route.

4. The system of claim 1, wherein the first computing device is further configured to:
   determine, based on the 3D risk map, one or more road segments the vehicle has traveled;
   calculate one or more road segment risk scores for the one or more road segments; and
   transmit the one or more road segment risk scores.

5. The system of claim 1, wherein the first computing device is further configured to:
   determine a risk score for at least one of the one or more risk objects;
   output a first alert if the risk score is above a predetermined threshold; and
   output a second alert if the risk score is below the predetermined threshold.

6. The system of claim 1, wherein the first computing device is further configured to:
   output an audio alert based on the risk score exceeding a threshold.

7. The system of claim 1, wherein the first computing device is further configured to:
  assign a color to each of the one or more risk objects, wherein the color is based on the risk score and represents a level of risk for each of the one or more risk objects.

8. The system of claim 7, wherein the first computing device is further configured to:
  update the 3D risk map to change the color of a particular risk object among the one or more risk objects to red if the level of risk associated with the particular risk object is greater than a predetermined threshold.

9. The system of claim 1, further comprising:
  a second server configured to store weather information,
  wherein the first computing device is further configured to communicate with the second server to receive the weather information, and
  wherein generation of the particular 3D virtual world is further based on the weather information, such that the particular 3D virtual world illustrates a weather condition.

10. The system of claim 1, further comprising:
  one or more second sensors coupled to a second vehicle or an element of infrastructure, wherein the one or more second sensors are configured to detect second sensor information; and
  a second computing device configured to:
    analyze the second sensor information to identify one or more second risk objects; and
    transmit additional information indicating the one or more second risk objects,
  wherein the first computing device is further configured to:
    receive the additional information transmitted by the second computing device;
    based on the additional information, update the 3D risk map by superimposing one or more second point clouds corresponding to the one or more second risk objects, respectively, into the particular 3D virtual world; and
    display the updated 3D risk map to a person in the vehicle.

11. The system of claim 1, wherein the first computing device is further configured to dynamically update the 3D risk map to provide an updated virtual world representing environments along subsequent road segments as the vehicle moves.

12. The system of claim 1, wherein the first computing device is further configured to:
  determine that the vehicle was in an accident;
  analyze the 3D risk map to determine a cause of the accident;
  determine if the accident is on a pre-determined list of accidents that indicate which accidents are eligible for insurance claim processing by the system; and
  if the accident is on the pre-determined list, construct, based on the cause of the accident, an insurance claim.

13. The system of claim 12, wherein the first computing device is further configured to:
  compare information regarding damage to the vehicle with a location of the one or more risk objects within the 3D risk map.

14. The system of claim 12, wherein the first computing device is further configured to:
  transmit a notification to a driver or owner of the vehicle in response to constructing the insurance claim.

15. The system of claim 12, wherein the first computing device is further configured to:
  adjust an insurance premium of an insurance policy associated with the vehicle based on the cause of the accident.

16. A method comprising:
  receiving, by a computing device and from a server, template map data comprising environmental information indicating environments along road segments for generating one or more three-dimensional (3D) virtual worlds representing the environments;
  receiving, by the computing device and from a global positioning system device, geographic location information for a vehicle;
  determining, based on the geographic location information, a particular road segment on which the vehicle is located among the road segments of the template map data;
  determining, based on a portion of the environmental information of the template map data corresponding to the particular road segment, a particular environment along the particular road segment;
  generating a particular 3D virtual world representing the particular environment along the particular road segment on which the vehicle is located;
  receiving, by the computing device from one or more sensors coupled to the vehicle, sensor information;
  analyzing, by the computing device, the sensor information to identify one or more risk objects;
  generating, by the computing device, one or more point clouds illustrating the one or more risk objects, respectively;
  generating, by the computing device, a 3D risk map by superimposing the one or more point clouds into the particular 3D virtual world;
  outputting, by the computing device and to a display device of the vehicle, the 3D risk map for display;
  determining a risk score for at least one of the one or more risk objects;
  outputting a first alert if the risk score is above a predetermined threshold; and
  outputting a second alert if the risk score is below the predetermined threshold.

17. The method of claim 16, further comprising:
  determining a route of travel of the vehicle; and
  calculating a route risk score of the route,
  wherein the generating the 3D risk map is further based on the route risk score.

18. The method of claim 16, further comprising:
  determining a road segment associated with a location of the vehicle;
  calculating a road segment risk score for the road segment; and
  updating, based on the road segment risk score, the 3D risk map to alert a person about a level of risk associated with the road segment.

19. The method of claim 16, further comprising:
  outputting an alert after a determination that the risk score is above a predetermined threshold.

20. An apparatus comprising:
  one or more processors; and
  memory storing computer-executable instructions that, when executed by the one or more processors, cause the apparatus to:
    receive, from a server, template map data comprising environmental information indicating environments along road segments for generating one or more three-dimensional (3D) virtual worlds representing the environments;

receive, from a global positioning system device, geographic location information for a vehicle;

determine, based on the geographic location information, a particular road segment on which the vehicle is located among the road segments of the template map data;

determine, based on a portion of the environmental information of the template map data corresponding to the particular road segment, a particular environment along the particular road segment;

generate a particular 3D virtual world representing the particular environment along the particular road segment on which the vehicle is located;

receive, from one or more sensors coupled to the vehicle, sensor information;

analyze the sensor information to identify one or more risk objects;

generate one or more point clouds illustrating the one or more risk objects, respectively;

generate a 3D risk map by superimposing the one or more point clouds into the particular 3D virtual world;

output, a display device of the vehicle, the 3D risk map for display;

determine a risk score for at least one of the one or more risk objects;

output a first alert if the risk score is above a predetermined threshold; and output a second alert if the risk score is below the predetermined threshold.

* * * * *